US009699668B2

(12) United States Patent
Park et al.

(10) Patent No.: US 9,699,668 B2
(45) Date of Patent: Jul. 4, 2017

(54) METHODS FOR MEASURING AND TRANSMITTING DOWNLINK SIGNALS AND APPARATUSES THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Anyang-si (KR); Sukho Shin, Seoul (KR); Jaewon Kim, Gimpo-si (KR); Donghyun Lee, Seoul (KR); Kijun Kim, Anyang-si (KR); Wonjin Sung, Seoul (KR)

(73) Assignees: LG Electronics Inc., Seoul (KR); Songang University Research Foundation, Seoul (KR)

(*) Notice: Subject to any disclaimer, the term of this patent is extended or adjusted under 35 U.S.C. 154(b) by 329 days.

(21) Appl. No.: 13/868,668

(22) Filed: Apr. 23, 2013

(65) Prior Publication Data

US 2013/0279356 A1    Oct. 24, 2013

Related U.S. Application Data

(60) Provisional application No. 61/637,795, filed on Apr. 24, 2012.

(51) Int. Cl.
*H04L 1/00* (2006.01)
*H04L 12/26* (2006.01)
(Continued)

(52) U.S. Cl.
CPC .......... *H04W 24/02* (2013.01); *H04B 7/0665* (2013.01); *H04B 7/0695* (2013.01);
(Continued)

(58) Field of Classification Search
CPC ......... H04W 16/28; H04B 7/086; H04B 7/02; H04B 7/0897; H04B 7/04; H04B 7/0617
See application file for complete search history.

(56) References Cited

U.S. PATENT DOCUMENTS

2009/0253387 A1* 10/2009 Van Rensburg ......... H01Q 3/40
455/90.2
2010/0075705 A1* 3/2010 van Rensburg ........ H04B 7/024
455/509

(Continued)

FOREIGN PATENT DOCUMENTS

KR    WO2010110588 A2 *  9/2010  ............. H04L 27/26

*Primary Examiner* — Yemane Mesfin
*Assistant Examiner* — Abdelillah Elmejjarmi
(74) *Attorney, Agent, or Firm* — Birch, Stewart, Kolasch & Birch, LLP

(57) ABSTRACT

A method in which a User Equipment (UE) measures a downlink signal in a wireless communication system is disclosed. The method includes receiving information about a Beam Direction Pattern (BDP) of the downlink signal and measuring the downlink signal based on the information about the BDP. The information about the BDP includes an index of a subframe in which the downlink signal is to be transmitted using a specific BDP and includes an identifier (ID) of the specific BDP. The BDP of the downlink signal is switched according to the subframe index based on the information about the BDP.

10 Claims, 24 Drawing Sheets

(51) Int. Cl.
*H04W 24/02* (2009.01)
*H04B 7/06* (2006.01)
*H04L 5/00* (2006.01)
H04W 16/28 (2009.01)
H04W 72/04 (2009.01)
H04L 5/14 (2006.01)

(52) U.S. Cl.
CPC ............ *H04L 5/001* (2013.01); *H04L 5/0053* (2013.01); *H04L 5/0023* (2013.01); *H04L 5/0048* (2013.01); *H04L 5/1469* (2013.01); *H04W 16/28* (2013.01); *H04W 72/042* (2013.01)

(56) References Cited

U.S. PATENT DOCUMENTS

2011/0002373 A1* 1/2011 Jeon ................. H04B 7/043
 375/228
2012/0014477 A1* 1/2012 Ko .................... H04B 7/0613
 375/299

* cited by examiner

FIG. 5
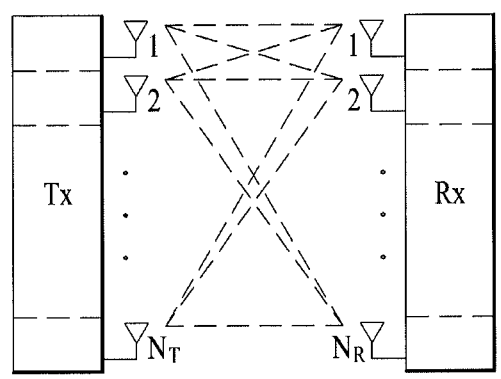
(a)
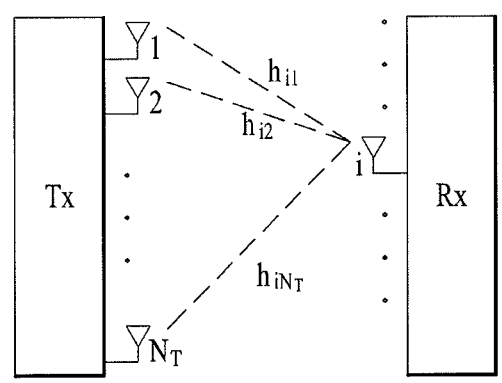
(b)

FIG. 9
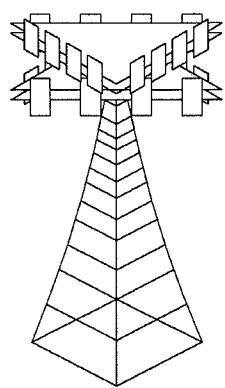
(a)
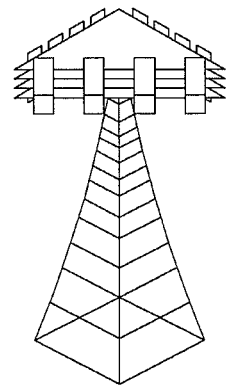
(b)

FIG. 10
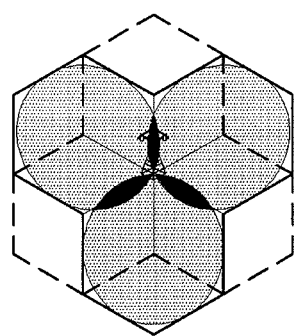 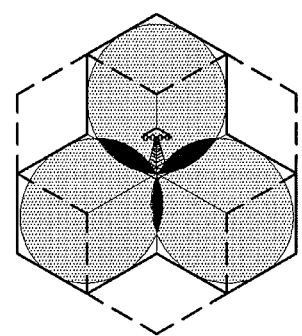
(a) BDP 1                          (b) BDP 2

FIG. 11
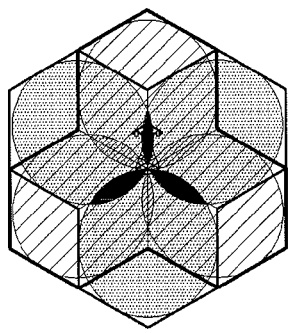
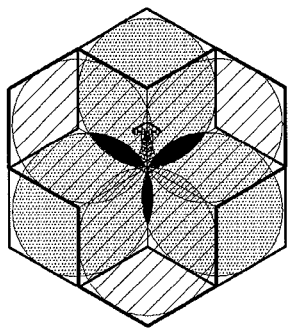
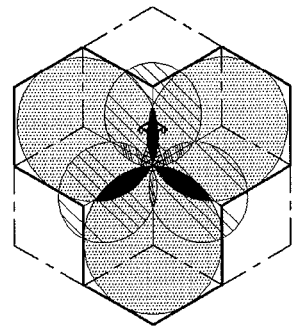
(a) BDP 1 = CC#1
BDP 2 = CC#2
(b) BDP 1 = CC#2
BDP 2 = CC#1
(c) BDP 1 = CC#1
BDP 2 = CC#3
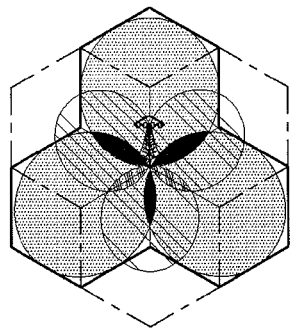
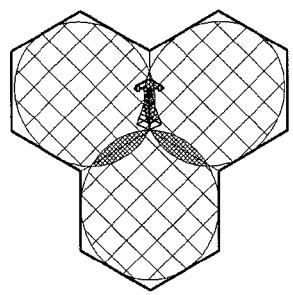
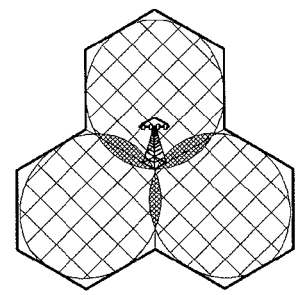
(d) BDP 1 = CC#3
BDP 2 = CC#1
(e) BDP 1 = CC#1
BDP 1 = CC#2
(f) BDP 2 = CC#1
BDP 2 = CC#2
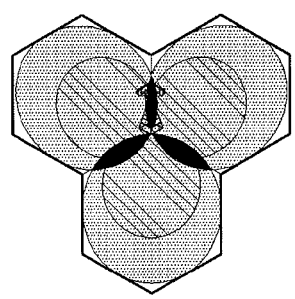
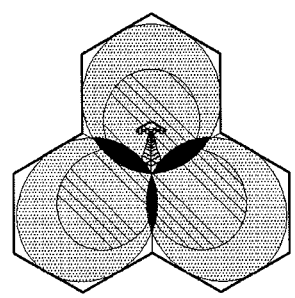
(g) BDP 1 = CC#1
BDP 1 = CC#3
(h) BDP 2 = CC#1
BDP 2 = CC#3

FIG. 14
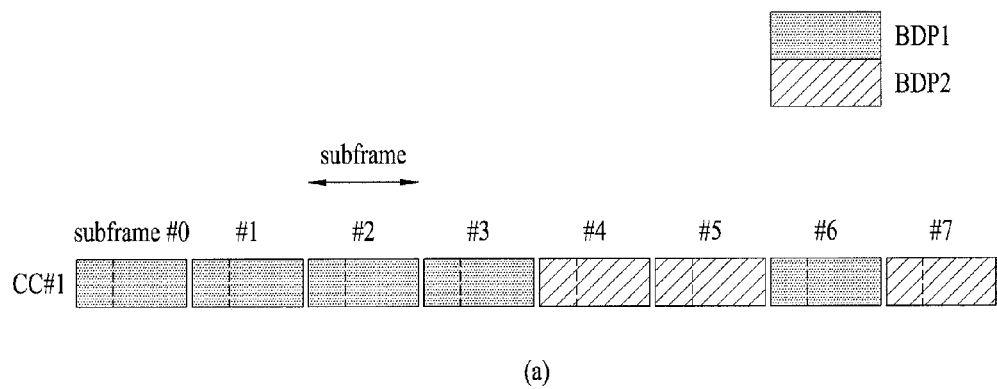
(a)
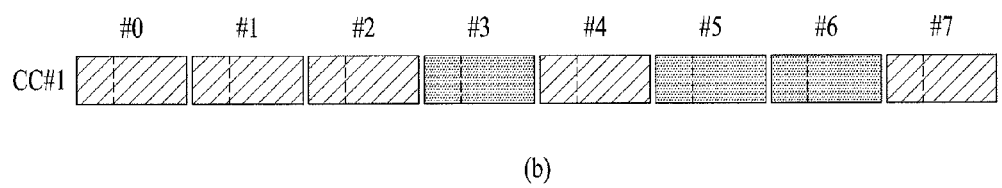
(b)

FIG. 16
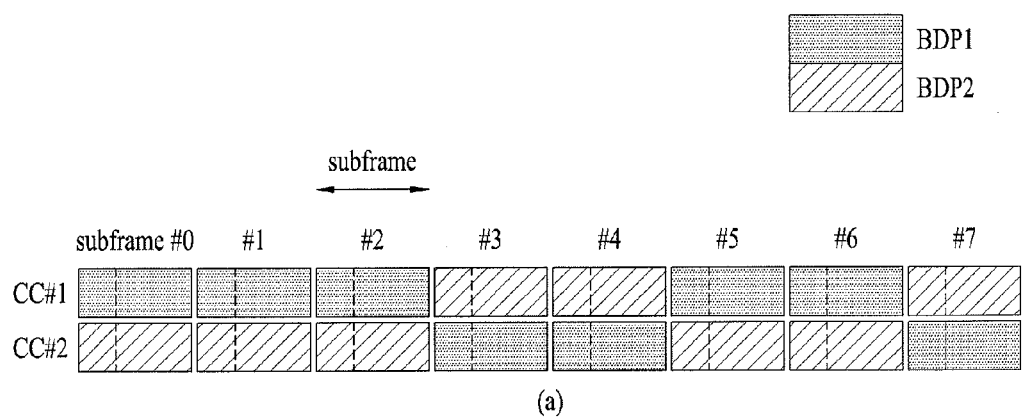
(a)
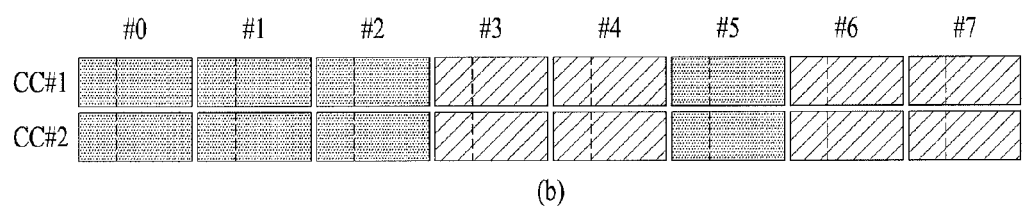
(b)

FIG. 17
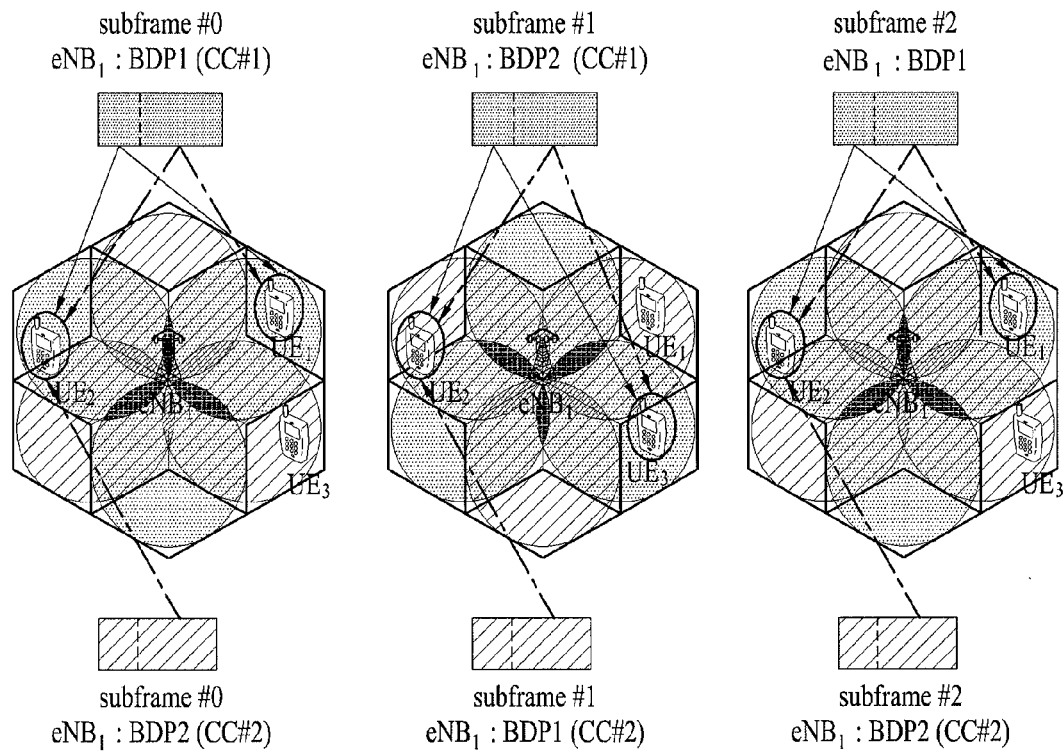
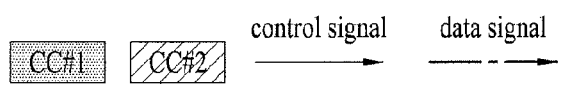 control signal →  data signal -->
| | Pcell | component carrier capable of transmitting and receiving |
|---|---|---|
| UE 1 | eNB$_1$ - CC#1 | CC#1 |
| UE 2 | eNB$_1$ - CC#1 | CC#1 & CC#2 |
| UE 3 | eNB$_1$ - CC#1 | CC#1 |
* Pcell : primary cell in which UE receives control signal

FIG. 20
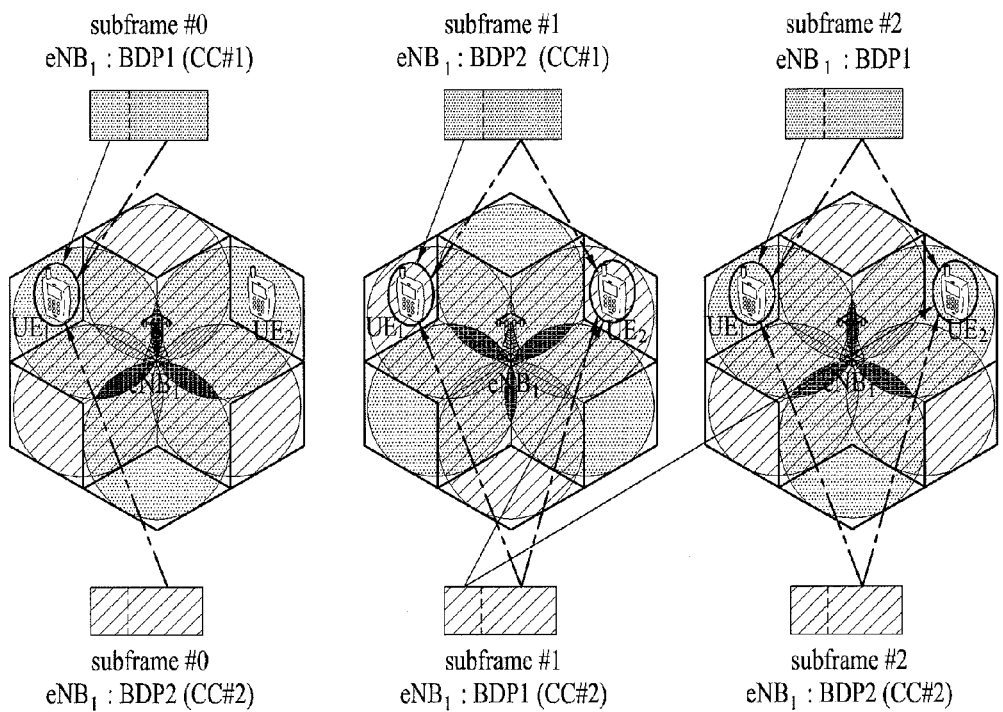
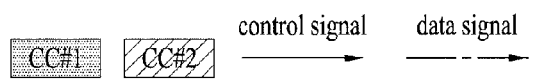
control signal ——→    data signal – – →
| | Pcell | component carrier capable of transmitting and receiving |
|---|---|---|
| UE 1 | $eNB_1$ - CC#1 | CC#1 & CC#2 |
| UE 2 | $eNB_1$ - CC#2 | CC#1 & CC#2 |
\* Pcell : primary cell in which UE receives control signal

FIG. 21
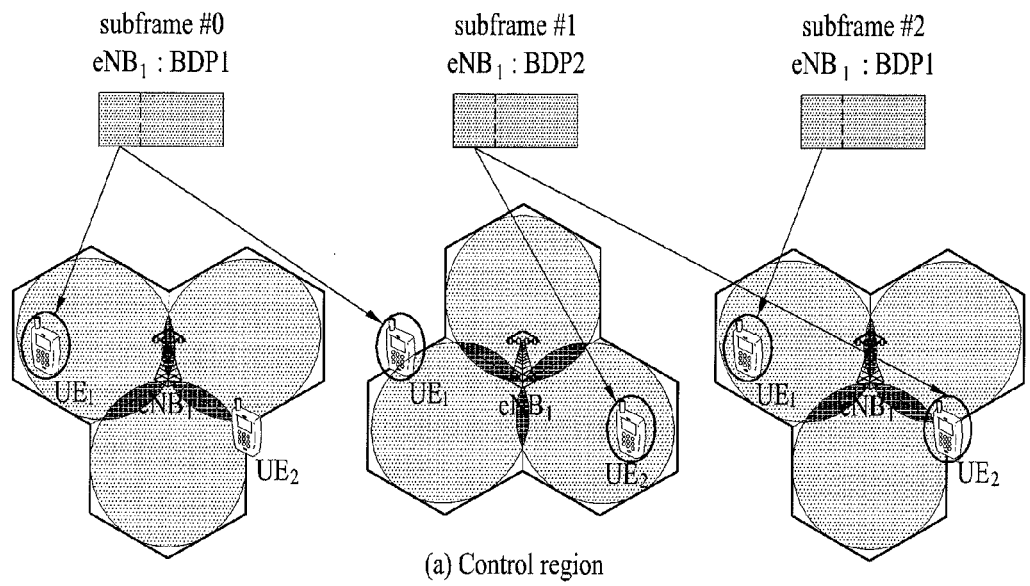
(a) Control region
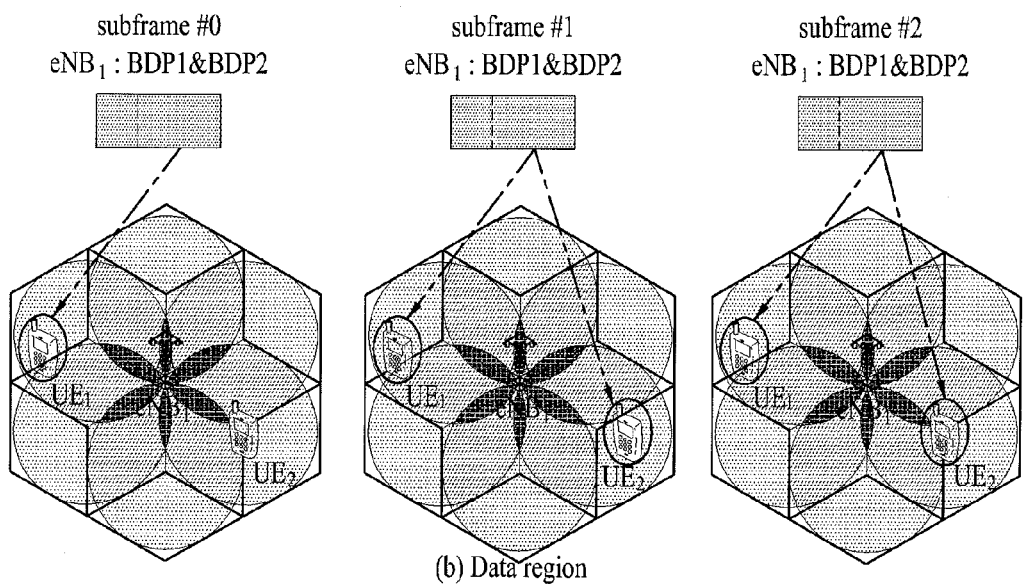
(b) Data region
|  | Pcell | component carrier capable of transmitting and receiving |
|---|---|---|
| UE 1 | eNB$_1$ - CC#1 | CC#1 |
| UE 2 | eNB$_1$ - CC#1 | CC#1 |
* Pcell : primary cell in which UE receives control signal FIG. 22
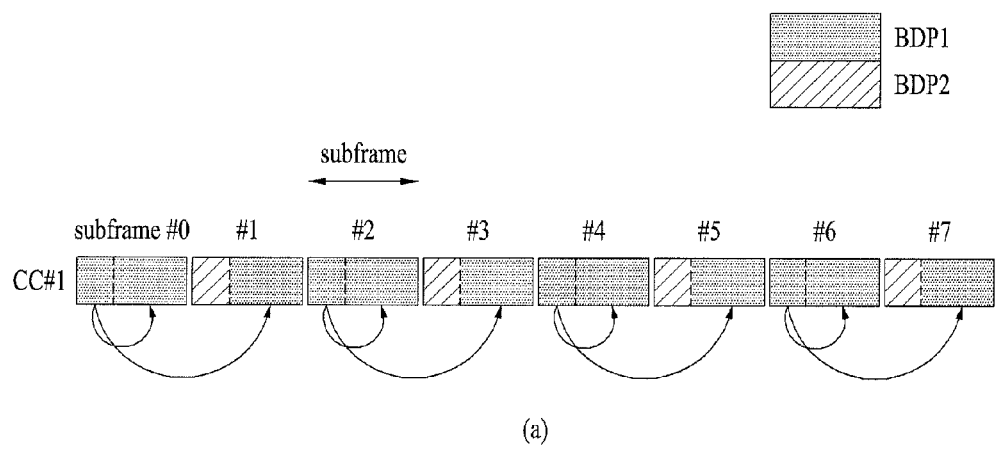
(a)
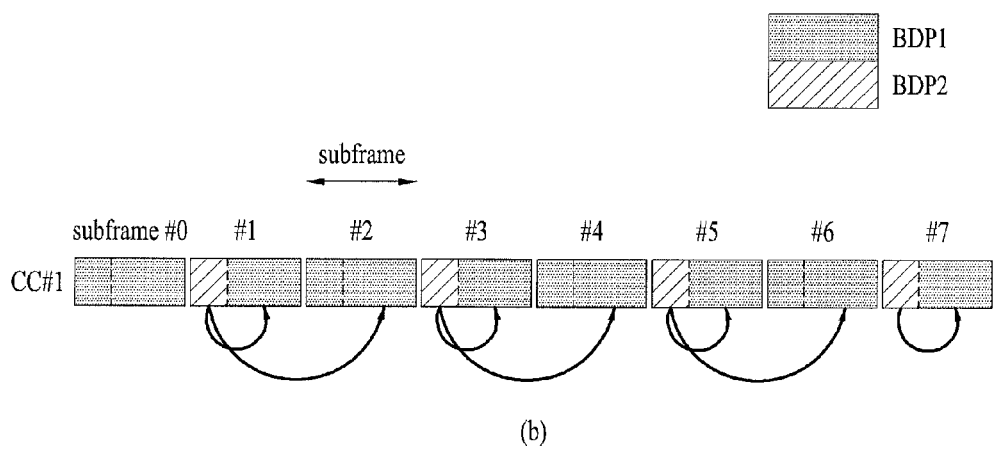
(b)

FIG. 23
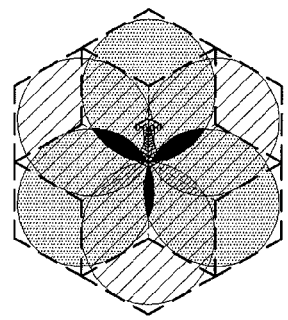
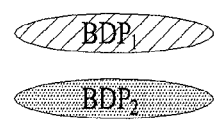
(a)
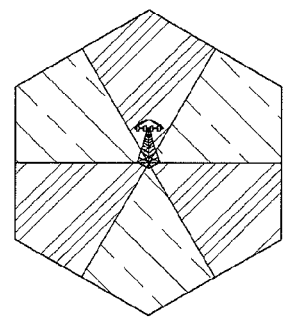
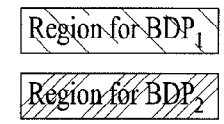
(b)
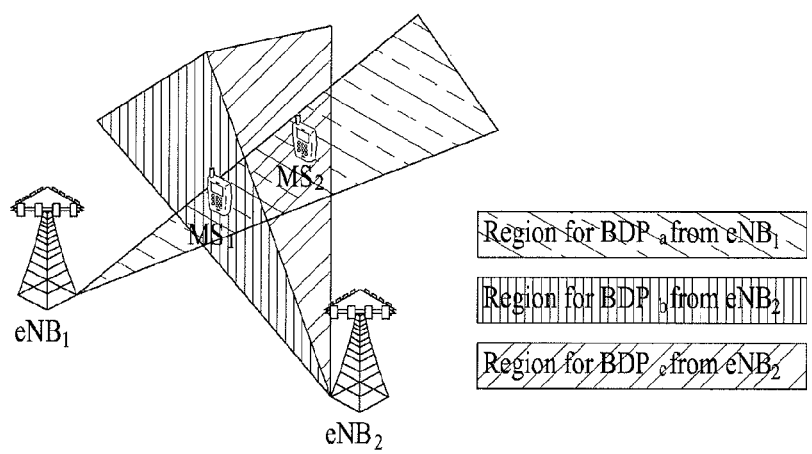
(c)

METHODS FOR MEASURING AND TRANSMITTING DOWNLINK SIGNALS AND APPARATUSES THEREFOR

This application claims the benefit of U.S. Provisional Application No. 61/637,795, filed on Apr. 24, 2012, which is hereby incorporated by reference as if fully set forth herein.

BACKGROUND OF THE INVENTION

Field of the Invention

The present invention relates to a wireless communication system, and more particularly, to a method for measuring downlink signals, a method for transmitting downlink signals, and apparatuses therefor.

Discussion of the Related Art

A model of a conventional 3-sector wireless communication system is illustrated in FIG. 8. An overall system includes a plurality of cells and each cell further divided into sectors is equipped with a macro eNB which is in charge of signal transmission. In a conventional wireless communication system providing a service using a 3-sector beam direction pattern in each cell, User Equipments (UEs) in the vicinity of the eNB have high transmission efficiency, whereas UEs at a cell edge have low transmission efficiency due to Inter-Cell Interference (ICI) and this is a main cause of performance degradation of the overall system.

Accordingly, a method for improving disadvantages caused by the 3-sector wireless communication system is needed.

SUMMARY OF THE INVENTION

An object of the present invention is to provide an apparatus for relieving an abrupt performance degradation phenomenon generated at a cell edge of a conventional cellular mobile communication system and a method for applying the apparatus to a system. More specifically, an apparatus including an antenna apparatus which supports a plurality of beam direction patterns, a signal transmission method using the apparatus, and a user scheduling method using the apparatus are proposed.

By applying the apparatus and methods proposed in the present invention to a cellular mobile communication system, effective improvement in performance of low-layer UEs, which are located at a cell edge and receive low-quality signals due to strong interference signals received from a neighboring cell, is expected.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for measuring a downlink signal at a User Equipment (UE) in a wireless communication system includes receiving information about a Beam Direction Pattern (BDP) of the downlink signal and measuring the downlink signal based on the information about the BDP, wherein the information about the BDP includes an index of a subframe in which the downlink signal is to be transmitted using a specific BDP and includes an identifier (ID) of the specific BDP and wherein the BDP of the downlink signal is switched according to a subframe index based on the information about the BDP.

The information about the BDP may include an ID of a subframe set in which the downlink signal is to be transmitted using a specific BDP and include an ID of the specific BDP.

The method may further include receiving downlink control information in one subframe set included in the information about the BDP.

The downlink control information may indicate scheduling of downlink data information in a subframe set other than a subframe set in which the downlink control information is received.

The method may further include reporting BDP information related to downlink signal reception quality based on the measured result, wherein the BDP information related to downlink signal reception quality includes information about a BDP having best downlink signal reception quality and information about a BDP having worst downlink signal reception quality.

The method may further include transitioning to an idle state in subframes except for a subframe transmitted using the BDP having best downlink signal reception quality.

The BDP information related to downlink signal reception quality may be used for position estimation of the UE.

In another aspect of the present invention, a met hod for transmitting a downlink signal at an eNodeB (eNB) in a wireless communication system includes transmitting information about a Beam Direction Pattern (BDP) of the downlink signal to a User Equipment (UE) and switching the BDP of the downlink signal according to a subframe index based on the information about the BDP to transmit the downlink signal to the UE, wherein the information about the BDP includes an index of a subframe in which the downlink signal is to be transmitted using a specific BDP and includes an identifier (ID) of the specific BDP.

The information about the BDP may include an ID of a subframe set in which the downlink signal is to be transmitted using a specific BDP and include an ID of the specific BDP.

The method may further include transmitting downlink control information for the UE in one subframe set included in the information about the BDP.

The downlink control information may indicate scheduling of downlink data information in a subframe set other than a subframe set in which the downlink control information is received.

The method may further include receiving BDP information related to downlink signal reception quality based on a downlink signal measured result performed by the UE, wherein the BDP information related to downlink signal reception quality includes information about a BDP having best downlink signal reception quality and information about a BDP having worst downlink signal reception quality.

The method may further include causing the UE to transition to an idle state in subframes except for a subframe transmitted using the BDP having best downlink signal reception quality.

The BDP information related to downlink signal reception quality may be used for position estimation of the UE.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a configuration of a wireless communication system having multiple antennas;

FIG. 9 illustrates an antenna apparatus for transmitting signals formed as a multi-beam direction pattern;

FIG. 10 illustrates examples of a Beam Direction Pattern (BDP);

FIG. 11 illustrates wireless communication systems to which multiple BDPs and related CCS are applied;

FIG. 14 illustrates a BDP allocated to each subframe according to another embodiment of the present invention;

FIG. 16 illustrates a BDP allocated to each subframe of carrier aggregation according to another embodiment of the present invention;

FIG. 17 specifically illustrates a BDP allocated to each subframe of carrier aggregation according to an embodiment of the present invention;

FIG. 20 specifically illustrates a BDP allocated to each subframe of carrier aggregation according to another embodiment of the present invention;

FIG. 21 illustrates a wireless communication system to which a BDP allocated to each subframe of carrier aggregation and a DL scheduling scheme are applied, according to another embodiment of the present invention;

FIG. 22 illustrates a BDP allocated to each subframe of carrier aggregation and a DL scheduling scheme according to another embodiment of the present invention;

FIG. 23 illustrates a position measurement scheme using multiple BDPs according to an embodiment of the present invention.

DETAILED DESCRIPTION OF THE INVENTION

Figure 1:
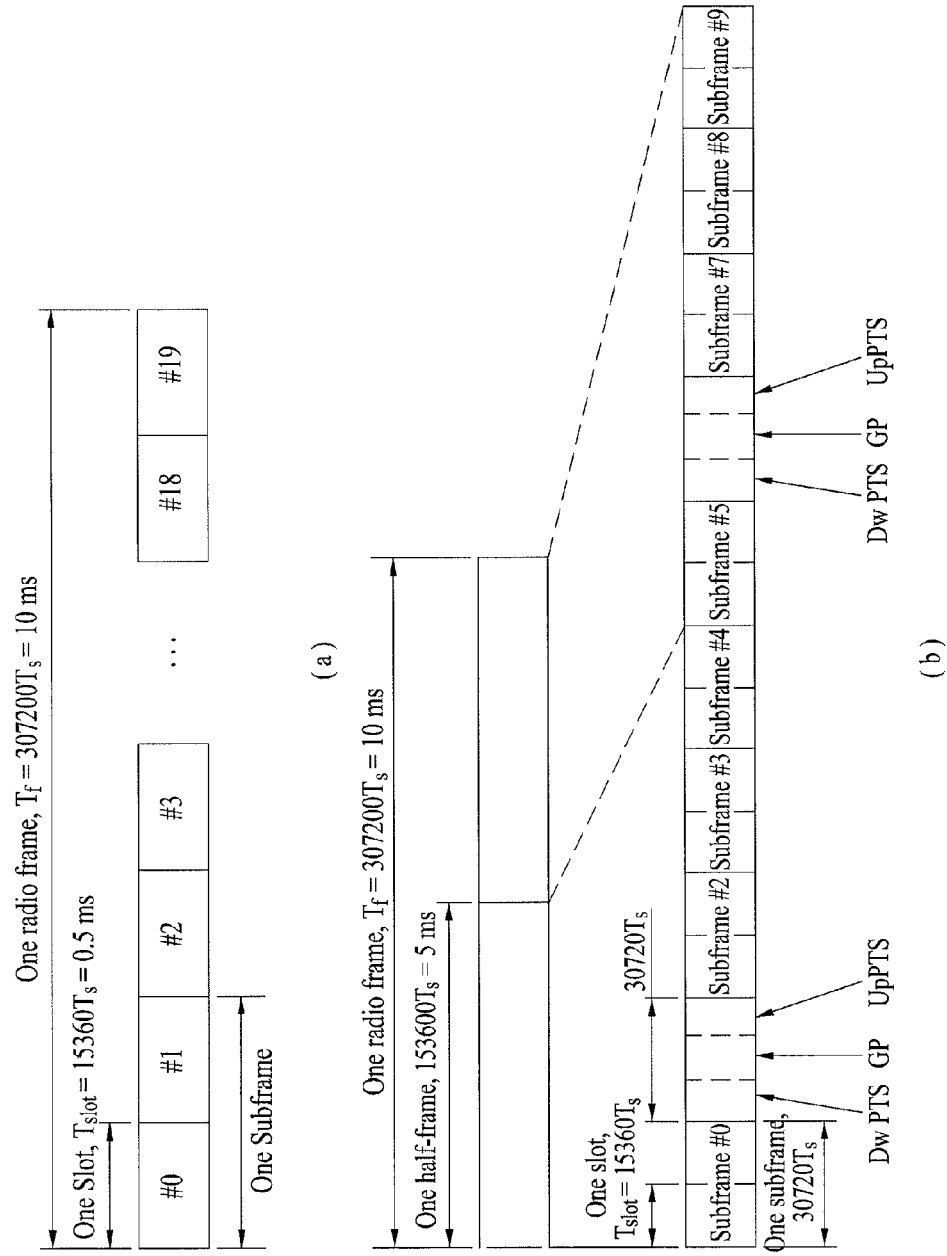
FIG. 1 illustrates an exemplary radio frame structure used in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH.

In the present invention, transmission of a PDCCH/PC-FICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 is a diagram showing the structure of a radio frame used in a wireless communication system. In particular, FIG. 1(*a*) shows a radio frame structure used in frequency division duplex (FDD) in 3GPP LTE(-A) and FIG. 1(*b*) shows a radio frame structure used in time division duplex (TDD) in 3GPP LTE(-A).

Referring to FIG. 1, a radio frame used in 3GPP LTE(-A) has a length of 10 ms (307200·Ts) and includes 10 subframes with the same size. The 10 subframes of the radio frame may be numbered. Ts denotes sampling time, and is represented by Ts=1/(2048*15 kHz). Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL config-uration | Downlink-to-Uplink Switch-point period-icity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
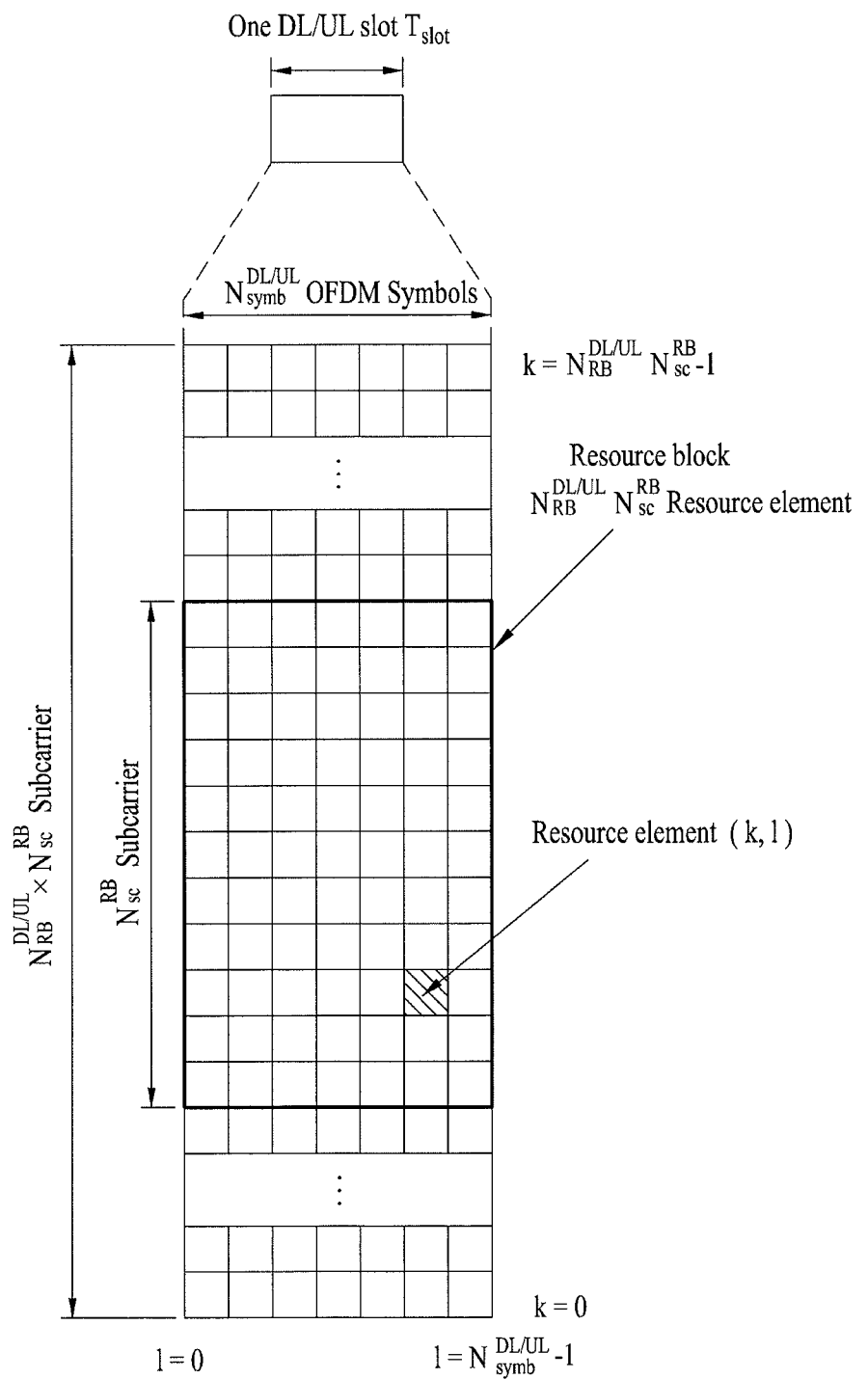
FIG. 2 illustrates an exemplary DL/UL slot structure in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB}*N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to as a resource element (RE) or tone. Accordingly, one RB includes $N^{DL/UL}_{symb}*N^{RB}_{sc}$ REs.

Each RE within a resource grid may be uniquely defined by an index pair (k, l) within one slot. k is an index applied from 0 to NDL/ULRB*NRBsc−1 in a frequency domain, and l is an index from 0 to NDL/ULsymb−1 in a time domain.

In one subframe, two RBs respectively located in two slots of the subframe while occupying the same NRBsc consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, nPRB=nVRB. The localized VRBs are numbered from 0 to NDLVRB−1 and NDLVRB=NDLRB. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
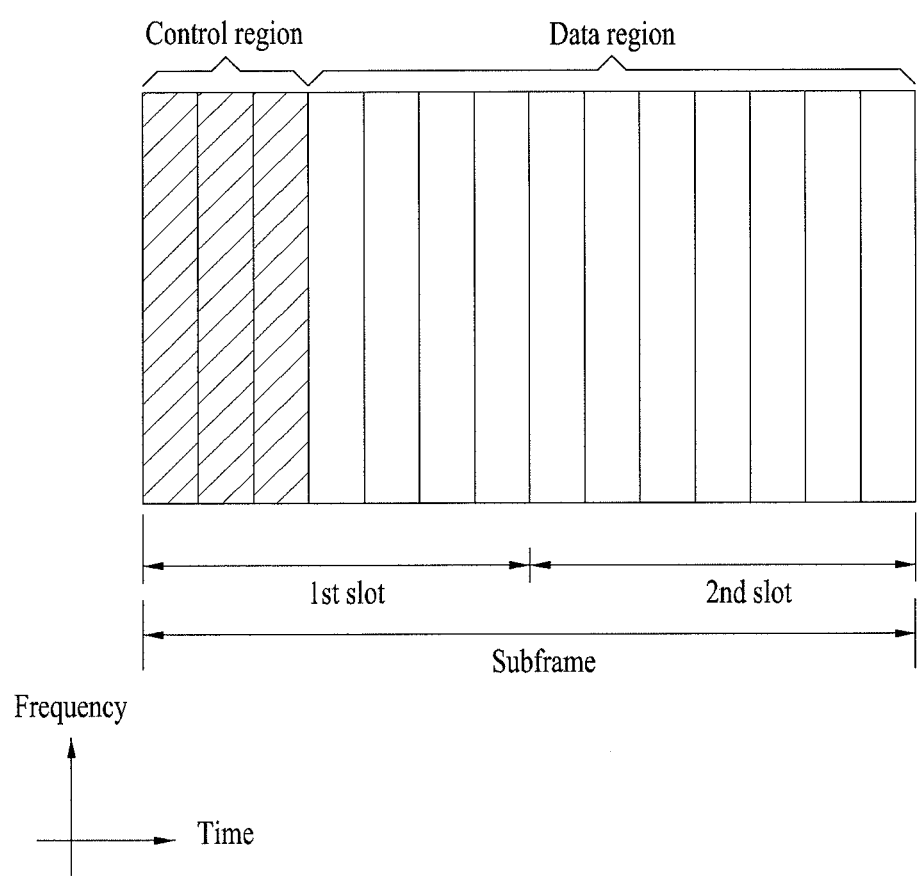
FIG. 3 illustrates an exemplary DL subframe structure used in a 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
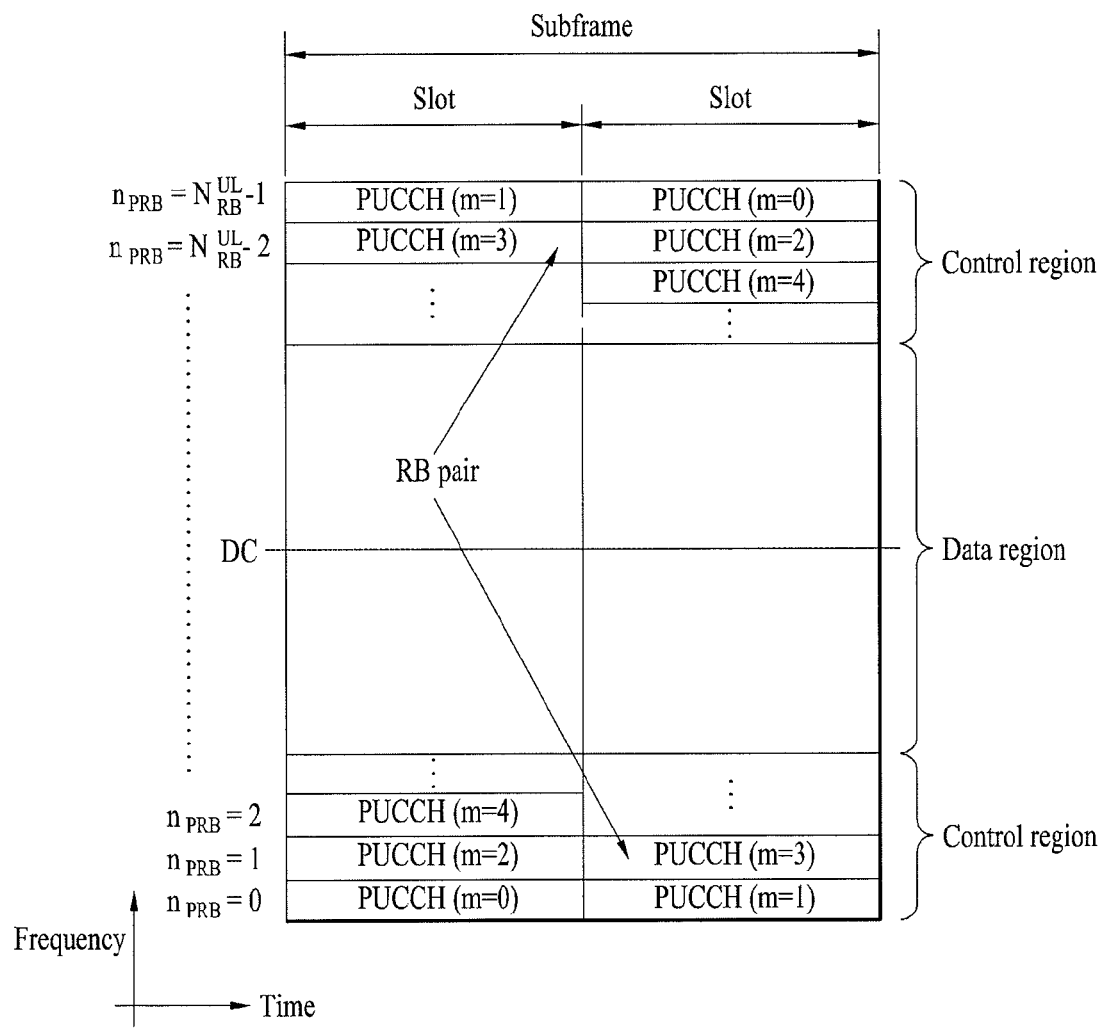
FIG. 4 illustrates an exemplary UL subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

A UE is assigned PUCCH resources for transmission of UCI by a BS through a higher-layer signal, a dynamic control signal, or an implicit scheme. Physical resources used for a PUCCH depend on two parameters, $N_{RB}^{(2)}$ and $N_{CS}^{(1)}$, given by a higher layer. The parameter $N_{RB}^{(2)}$, which is equal to or greater than 0, indicates available bandwidth for transmission of PUCCH format 2/2a/2b at each slot and is expressed as an integer multiple of $N_{SC}^{RB}$. The parameter variable $N_{CS}^{(1)}$ indicates the number of cyclic shifts used for PUCCH format 1/1a/1b in an RB used for a mixture of formats 1/1a/1b and 2/2a/2b. A value of $N_{CS}^{(1)}$ is integer an integer multiple of $\Delta_{shift}^{PUCCH}$ within a range of {0, 1, . . . 7}. $\Delta_{shift}^{PUCCH}$ is provided by a higher layer. If $N_{CS}^{(1)}$ is 0, no mixed RB is present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by an antenna port p are expressed by $n_{PUCCH}^{(1,\tilde{p})}$, $n_{PUCCH}^{(2,\tilde{p})} < N_{RB}^{(2)} N_{SC}^{RB} + \text{ceil}(N_{CS}^{(1)}/8) \cdot (N_{SC}^{RB} - N_{CS}^{(1)} - 2)$ and $n_{PUCCH}^{(3,\tilde{p})}$, respectively, which are indexes having non-negative integers.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for transmission of the PUCCH at a slot ns is given as:

$$n_{PRB} = \begin{cases} \left\lfloor \frac{m}{2} \right\rfloor & \text{if } (m + n_S \text{ mod2)mod2} = 0 \\ N_{RB}^{UL} - 1 - \left\lfloor \frac{m}{2} \right\rfloor & \text{if } (m + n_S \text{ mod2)mod2} = 1 \end{cases} \quad \text{[Equation 1]}$$

Where a variable m depends on a PUCCH format and is given as Equation 2, Equation 3, and Equation 4 for PUCCH format 1/1a/1b, PUCCH format 2/2a/2b, and PUCCH format 3, respectively.

[Equation 2]

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + & \text{otherwise} \\ N_{RN}^{(2)} + \left\lceil \frac{N_{cs}^{(1)}}{8} \right\rceil \end{cases}$$

$$c = \begin{cases} 3 & \text{normal cyclic prefix} \\ 2 & \text{extended cyclic prefix} \end{cases}$$

In Equation 2, $n_{PUCCH}^{(1,\tilde{p})}$ denotes a PUCCH resource index of an antenna port p for PUCCH format 1/1a/1b and, in the case of an ACK/NACK PUCCH, $n_{PUCCH}^{(1,\tilde{p})}$ is a value implicitly determined by a first CCE index of a PDCCH carrying scheduling information of a corresponding PDSCH.

$$m = \lfloor n_{PUCCH}^{(2,\tilde{p})} / N_{sc}^{RB} \rfloor \quad \text{[Equation 3]}$$

where $n_{PUCCH}^{(2,\tilde{p})}$ denotes a PUCCH resource index of an antenna port p for PUCCH format 2/2a/2b and is a value transmitted to a UE from a BS through higher-layer signaling.

$$m = \lfloor n_{PUCCH}^{(3,\tilde{p})} / N_{SF,0}^{PUCCH} \rfloor \quad \text{[Equation 4]}$$

$n_{PUCCH}^{(3,\tilde{p})}$ denotes a PUCCH resource index of an antenna port p for PUCCH format 3 and is a value transmitted to a UE from a BS through higher-layer signaling. $N_{SF,0}^{PUCCH}$ indicates a spreading factor for a first slot of a subframe. For all of two slots of a subframe using normal PUCCH format 3, $N_{SF,0}^{PUCCH}$ is 5. For first and second slots of a subframe using a reduced PUCCH format 3, $N_{SF,0}^{PUCCH}$ is 5 and 4, respectively.

Referring to Equation 2, a PUCCH resource for ACK/NACK is not pre-allocated to each UE and a plurality of UEs in a cell shares a plurality of PUCCH resources at every time. More specifically, a PUCCH resource used by the UE to transmit ACK/NACK is dynamically determined based on a PDCCH which carries scheduling information for a PDSCH carrying DL data. An entire region in which the PDCCH is transmitted in each DL subframe includes a plurality of Control Channel Elements (CCEs) and the PDCCH transmitted to the UE includes one or more CCEs. The UE transmits ACK/NACK through a PUCCH resource linked to a specific CCE (e.g. a first CCE) among CCEs constituting the PDCCH received thereby. Hereinafter, the PUCCH resource, which is dynamically determined in association with the PDCCH, for ACK/NACK transmission is particularly referred to as an ACK/NACK PUCCH resource.

ACK/NACK is control information which is fed back to a transmitter from a receiver according to whether the receiver has successively decoded data transmitted by the transmitter. For example, if the UE succeeds in decoding DL data, the UE may feed back ACK information to the BS and, otherwise, the UE may feed back NACK information to the BS. More specifically, the following three cases are when the receiver requires ACK/NACK transmission in an LTE system.

The first case is when ACK/NACK for PDSCH transmission indicated by detection of a PDCCH is transmitted. The second case is that ACK/NACK for a PDCCH indicating Semi-Persistent Scheduling (SPS) release is transmitted. The third case is when ACK/NACK for a PDSCH transmitted without detecting a PDCCH and this case means ACK/NACK transmission for SPS. In the following description, an ACK/NACK transmission method is not restricted to any one of the above three cases unless otherwise mentioned.

FIG. 5 illustrates a configuration of a wireless communication system having multiple antennas.

As shown in FIG. 5(a), if the number of transmit antennas is increased to $N_T$ and the number of receive antennas is increased to $N_R$, theoretical channel transmission capacity is increased in proportion to the number of antennas, unlike the case where a plurality of antennas is used in either a transmitter or a receiver. Accordingly, it is possible to improve transmission rate and to remarkably enhance frequency efficiency. As the channel transmission capacity is increased, the transmission rate may be theoretically increased by a product of a maximum transmission rate $R_0$ upon using a single antenna and a rate increase ratio $R_i$.

$$R_i = \min(N_T, N_R) \quad \text{[Equation 5]}$$

For example, in a MIMO communication system using four transmit antennas and four receive antennas, a transmission rate which is four times that of a single antenna system may be theoretically obtained.

A communication method in the MIMO system is described in more detail using mathematical modeling. In the above system, it is assumed that $N_T$ transmit antennas and $N_R$ receive antennas are present.

In a transmission signal, if $N_T$ transmit antennas are present, a maximum number of pieces of transmission information is $N_T$. The transmission information may be expressed as follows.

$$s = [s_1, s_2, \ldots, s_{N_T}]^T \quad \text{[Equation 6]}$$

Individual transmission information pieces $s_1, s_2, \ldots, s_{N_T}$ may have different transmit powers. If the respective transmit powers are denoted by $P_1, P_2, \ldots, P_{N_T}$, transmission information having adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 7]}$$

In addition, $\hat{S}$ may be expressed using a diagonal matrix P of a transmit power as follows.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 8]}$$

It is assumed that $N_T$ transmission signals $x_1, x_2, \ldots, x_{N_T}$ to be actually transmitted are configured by applying a weight matrix W to the transmit power adjusted information vector $\hat{S}$. The weight matrix W serves to appropriately distribute transmission information to individual antennas according to a transport channel situation. $x_1, x_2, \ldots, x_{N_T}$ may be expressed using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 9]}$$

where, $W_{ij}$ denotes a weight between an i-th transmit antenna and a j-th information. W is also called a precoding matrix.

If $N_R$ receive antennas are present, respective reception signals $y_1, y_2, \ldots, y_{N_R}$ of the antennas may be expressed as follows.

$$y = [y_1, y_2, \ldots, y_{N_R}]^T \quad \text{[Equation 10]}$$

In modeling channels of the MIMO wireless communication system, the channels may be distinguished from each other according to transmit/receive antenna indexes. A channel passing from a transmit antenna j to a receive antenna i is denoted as $h_{ij}$. In an index order of $h_{ij}$, it is noted that an index of a receive antenna precedes an index of a transmit antenna.

FIG. 5(b) illustrates channels passing from the $N_T$ transmit antennas to the receive antenna i. The channels may be expressed in the form of a combination of a vector and a matrix. In FIG. 5(b), the channels passing from the $N_T$ transmit antennas to the receive antenna i may be represented as follows.

$$h_i^T = [h_{i1}, h_{i2}, \ldots, h_{iN_T}] \quad \text{[Equation 11]}$$

Accordingly, all channels passing from the $N_T$ transmit antennas to the $N_R$ receive antennas may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 12]}$$

Additive White Gaussian Noise (AWGN) is added to actual channels passing through the channel matrix H. AWGN $n_1, n_2, \ldots, n_{N_R}$ added to the respective $N_R$ receive antennas may be expressed as follows.

$$n = [n_1, n_2, \ldots, n_{N_R}]^T \quad \text{[Equation 13]}$$

According to the above-described mathematical modeling method, a reception signal may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 14]

$$Hx + n$$

Meanwhile, the numbers of rows and columns of the channel matrix H indicating a channel state are determined by the number of transmit and receive antennas. The number of rows of the channel matrix H is equal to the number of receive antennas, $N_R$, and the number of columns thereof is equal to the number of transmit antennas, $N_T$. That is, the channel matrix H is an $N_R \times N_T$ matrix.

A matrix rank is defined by the smaller of the number of rows and the number of columns, where the rows and the columns are independent of each other. Accordingly, the matrix rank cannot be greater than the number of rows or columns. The rank of the channel matrix H, rank(H), is restricted as follows.

$$\text{rank}(H) \leq \min(N_T, N_R)$$ [Equation 15]

Another definition of rank may be given as the number of non-zero Eigen values when a matrix is subjected to Eigen value decomposition. Similarly, rank may be defined as the number of non-zero singular values when a matrix is subjected to singular value decomposition. Accordingly, the physical meaning of rank in a channel matrix may be a maximum number of elements capable of transmitting different information via a given channel.

Figure 6:
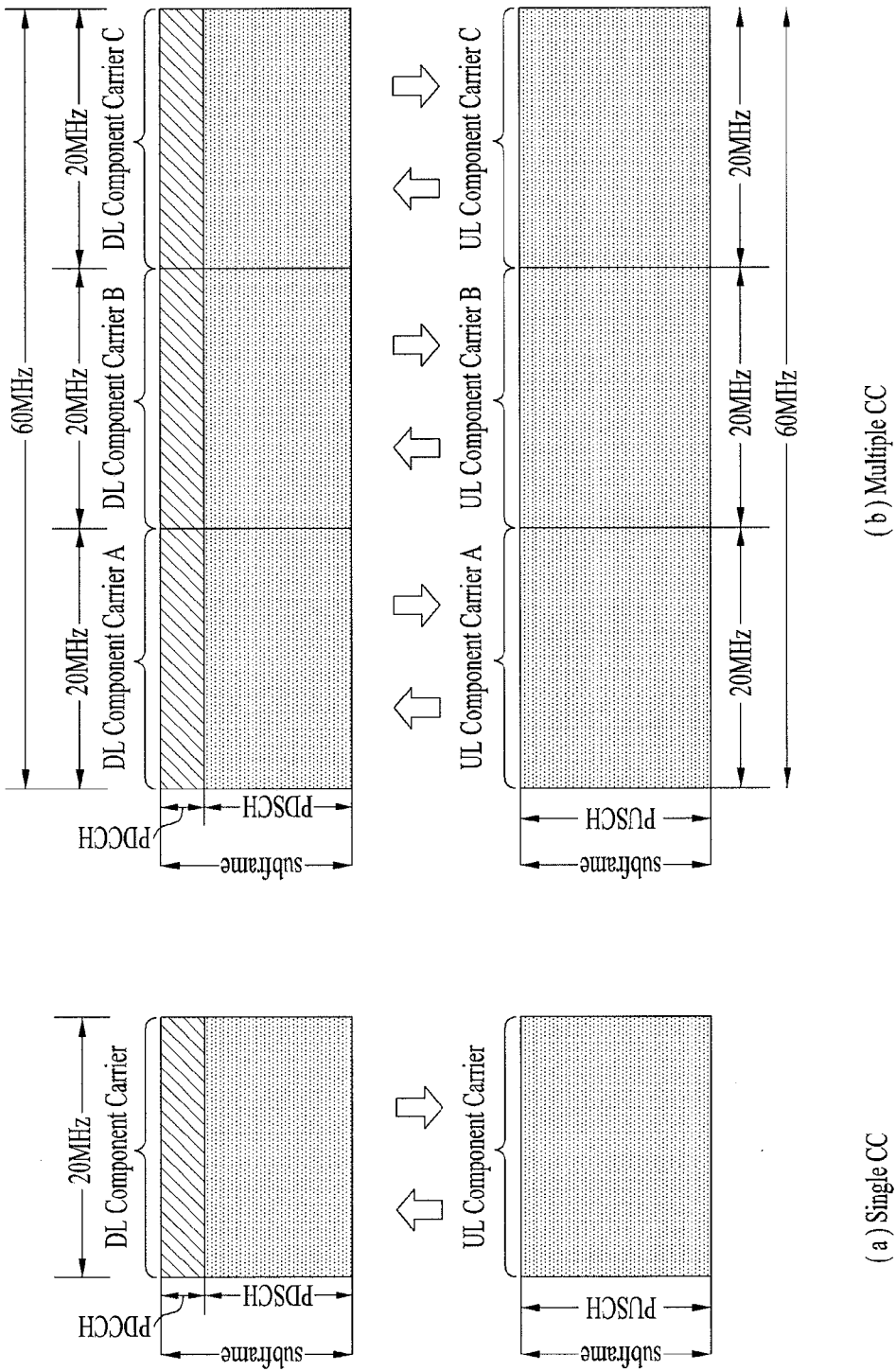
FIG. 6 is a view explaining carrier aggregation.

FIG. 6 illustrates Carrier Aggregation (CA). Prior to description of CA, the concept of a cell introduced to manage radio resources in an LTE-A system is described first. A cell is defined as a combination of a DL resource and a UL resource. Here, the UL resource is not an indispensible element. Accordingly, the cell can be configured with the DL resource alone or with both the DL resource and UL resource. However, this definition is given in the current LTE-A release-10 and the cell may be configured using the UL resource alone. The DL resource may be referred to as a DL Component Carrier (CC) and the UL resource may be referred to as a UL CC. The DL CC and the UL CC may be expressed as carrier frequencies and a carrier frequency indicates a center frequency of each cell.

A cell may be classified into a primary cell (PCell) operating on a primary frequency and a cell operating on a secondary frequency (SCell). The PCEll and SCell may be collectively referred to as a serving cell. The PCell may be a cell indicated in an initial connection establishment procedure, a connection re-establishment procedure, or a handover procedure, performed by a UE. That is, the PCell may be understood as a cell serving as a control-related center in a CA environment which will be described later. The UE may receive a PUCCH from a PCell thereof and transmit the received PUCCH. The SCell may be constructed after Radio Resource Control (RRC) connection establishment and may be used to provide additional radio resources. The remaining serving cells other than the PCell may be considered to be the SCell in the carrier aggregation environment. Provided that no CA is established in the UE of an RRC_CONNECTED status or the UE does not support CA, there is only one serving cell composed of only the PCell. In contrast, if CA is established in the UE of an RRC_CONNECTED status, there is at least one serving cell, and PCell and all SCells are included in the entire serving cell. For a UE supporting CA, after starting an initial security activation procedure, a network may configure one or more SCells, in addition to a PCell initially configured in the connection establishment procedure.

CA will hereinafter be described with reference to FIG. 6. CA has been introduced to utilize a wider band to provide a high transfer rate. CA may be defined as an aggregate of two or more CCs having different carrier frequencies. FIG. 6(a) shows a subframe in case that one CC is used in a legacy LTE system and FIG. 6(b) shows a subframe in case that CA is utilized. FIG. 6(b) exemplarily shows that three 20 MHz CCs are used to support a total bandwidth of 60 MHz. In this case, individual CCs may be contiguous or non-contiguous to each other.

The UE may simultaneously receive and monitor DL data through several DL CCs. A linkage between each DL CC and each UL CC may be indicated by system information. DL CC/UL CC link may be fixed in the system or semi-statically configured in the system. In addition, although the entire system bandwidth is composed of N CCs, a frequency band capable of being monitored/received by a specific UE may be limited to M CCs. (where M<N). Various parameters for CA may be cell-specifically, UE group-specifically, or UE-specifically established.

Figure 7:
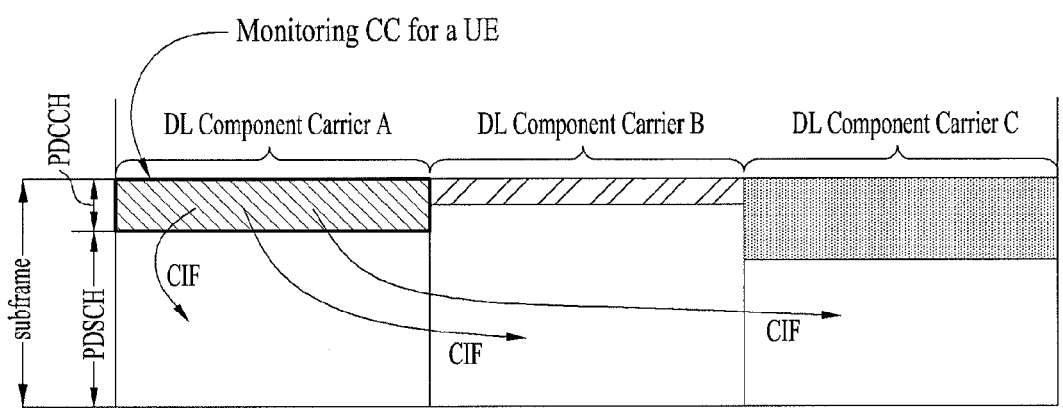
FIG. 7 is a view explaining cross-carrier scheduling.

FIG. 7 is a view explaining cross-carrier scheduling. For example, cross-carrier scheduling indicates that DL scheduling allocation information of different DL CCs is contained in a control region of any one of the serving cells or indicates that UL scheduling acknowledgement (ACK) information of several UL CCs linked to the corresponding DL CC is contained in a control region of any one DL CC selected from among several serving cells.

First, a Carrier Indicator Field (CIF) will be described in detail.

A CIF may be contained or not contained in a DCI format transmitted over a PDCCH as described above. If CIF is contained in the DCI format, the resultant CIF indicates that cross-carrier scheduling is applied. If cross-carrier scheduling is not applied, DL scheduling allocation information is considered to be valid on a DL CC via which current DL scheduling assignment information is transmitted. In addition, UL scheduling acknowledgement is considered to be valid on one UL CC linked to a DL CC via which DL scheduling allocation information is transmitted.

If cross-carrier scheduling is applied, a CIF indicates a CC related to DL scheduling allocation information transmitted over a PDCCH in any one of DL CCs. For example, as can be seen from FIG. 7, DL allocation information, i.e. information regarding PDSCH resources, for DL CC B and DL CC C is transmitted through a PDCCH contained in a control region of DL CC A. The UE monitors DL CC A such that it may recognize a resource region of a PDSCH and the corresponding CC through the CIF.

Information as to whether the CIF is contained in a PDCCH may be semi-statically established, or may be UE-specifically activated by higher layer signaling. If the CIF is disabled, PDSCH resources of the same DL CC may be assigned to a PDCCH of a specific DL CC and PUSCH resources of a UL CC linked to a specific DL CC may be assigned. In this case, the same coding scheme, the same CCE based resource mapping, and the same DCI format as those of the legacy PDCCH structure may be used.

Meanwhile, if CIF is enabled, PDSCH/PUSCH resources on one DL/UL CC indicated by the CIF from among multiple aggregated CCs may be assigned to a PDCCH of a specific DL CC. In this case, the CIF may be additionally defined in the legacy PDCCH DCI format or may be defined as a fixed field being 3 bits long and the CIF location may be fixed regardless of the DCI format size. In this case, the same coding scheme, the same CCE based resource mapping, and the same DCI format as those of the legacy PDCCH structure may also be applied.

Even in the case where the CIF is present, a BS may allocate a DL CC set to be monitored, resulting in reduction in load caused by blind decoding of a UE. A PUCCH monitoring CC set is a part of the entirely aggregated DL CCs and the UE may perform detection/decoding of a PDCCH in the corresponding CC set only. That is, in order to perform scheduling PDSCH/PUSCH for a UE, the BS may transmit a PDCCH only through the PDCCH monitoring CC set. The PDCCH monitoring DL CC set may be UE-specifically, UE group-specifically, or cell-specifically established. For example, if three DL CCs are aggregated as shown in FIG. 6, DL CC A may be set to a PDCCH monitoring DL CC. If the CIF is disabled, a PDCCH on each DL CC may schedule only a PDSCH of DL CC A. Meanwhile, if the CIF is disabled, not only a PDCCH on DL CC A but also a PDSCH on other DL CCs may be scheduled. If DL CC A is set to PDCCH monitoring CC, PDSCH is not transmitted to DL CC B and DL CC C.

In the system to which the above-mentioned CA is applied, a UE may receive several PDSCHs through several DL carriers. In this case, the UE may have to transmit ACK/NACK of each data through a single UL CC in a single subframe. In case of transmitting multiple ACKs/NACKs using PUCCH format 1a/1b in a single subframe, high transmit power is needed, PAPR for UL transmission is increased, and a transmit power amplifier is ineffectively used, such that a transmittable distance from the BS to the UE may be reduced. In order to transmit several ACKs/NACKs over a single PUCCH, ACK/NACK bundling or ACK/NACK multiplexing may be applied.

In addition, it may be necessary to transmit ACK/NACK information, that is used for a large amount of DL data according to the application of CA and/or a large amount of DL data transmitted in several DL subframes of a TDD system, over a PUCCH in one subframe. In this case, if the number of ACK/NACK bits to be transmitted is greater than the number of bits supportable by ACK/NACK bundling or multiplexing, it is impossible to correctly transmit ACK/NACK information using the above-mentioned methods.

Figure 8:
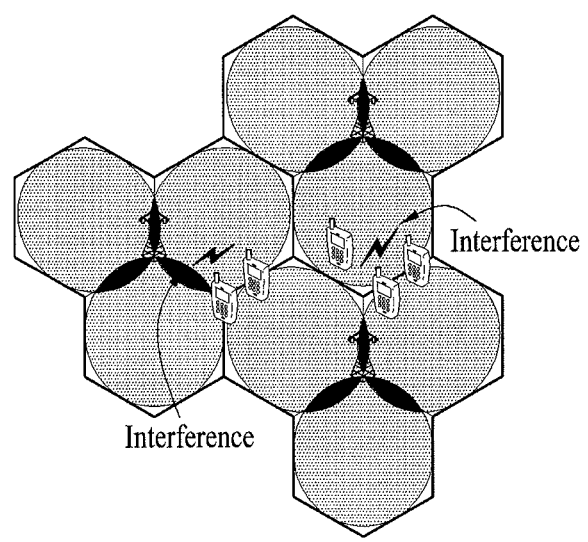
FIG. 8 illustrates a model of a 3-sector wireless communication system.

A model of a conventional 3-sector mobile communication cellular system is illustrated in FIG. 8. An overall system includes a plurality of cells and each cell further divided into sectors is equipped with an eNB (e.g. macro eNB) which is in charge of signal transmission. In the conventional system providing services using a 3-sector beam direction pattern in each cell, UEs in the vicinity of the eNB have high transmission efficiency, whereas UEs at a cell edge have low transmission efficiency due to ICI and this is a main cause of performance degradation of the overall system.

Hereinafter, an antenna apparatus supporting multiple Beam Direction Patterns (BDPs) is proposed and BDP switching is proposed as a signal transmission method using the antenna apparatus. The antenna apparatus may be included in the UE or eNB to be applied to a wireless communication system. In addition, an inter-subframe scheduling method capable of effectively applying the BDP support antenna apparatus and BDP switching to a mobile communication system is proposed.

According to exemplary embodiments of the present invention, a multi-layered antenna apparatus having a plurality of layered antennas, which may be installed in various transmission stations including a BS and a relay in a cellular mobile communication system, is proposed. Each layered antenna forms a unique BDP when it is used to transmit DL signals. In other words, each layered antenna has a unique BDP. A variety of types of BDPs may be selectively formed using a plurality of layered antennas. Hereinbelow, unique BDPs of individual layered antennas in an antenna apparatus having, for example, N layered structures will be denoted by $BDP_1$, $BDP_2$, . . . , $BDP_N$. FIG. 9 illustrates antenna apparatuses each having a two-layered structure as a detailed implementation method of the proposed apparatus. However, the proposed apparatus is not limited to the two-layered structure and may have a structure having an arbitrary number of layered antennas. The two layered antennas may be arranged at different angles as illustrated in FIG. 9(a) or at the same angle as illustrated in FIG. 9(b).

According to the number of layers of the proposed apparatus and a unique characteristic of a BDP of each layered antenna, various types of BDPs may be selectively formed by a combination of BDPs. FIG. 10 illustrates different types of BDPs of the respective layered antennas in the apparatus shown in FIG. 9(a). In FIG. 10, unique BDPs of the two layered antennas are denoted as BDP1 and BDP2, respectively, which have different cell coverage forms when the two layered antennas have a 60-degree difference. For example, if the two layered antennas of the apparatus shown in FIG. 9(a) are simultaneously activated, a signal is transmitted using a BDP of an overlapping type of BDP1 and BDP2 and, if only one of the two layered antennas is activated, a signal is transmitted using either BDP1 or BDP2.

In addition, the proposed apparatus may be applied, without restriction, to the case where signal transmission using the same CC in multi-layered antennas is supported and to the case where signal transmission using different multiple CCs in multi-layered antennas is supported. As described previously, if the proposed apparatus is used in transmission of a CC, all or some of layered antennas may be used for signal transmission. Meanwhile, when the proposed apparatus is used for transmission of multiple CCs, application to various types of BDPs is possible. When M CCs are denoted as CC#1, CC#2, . . . , CC#M, FIG. 11 illustrates implementation examples of various types of BDPs in the case where the apparatuses shown in FIG. 9 are used. FIGS. 11(a), 11(b), 11(c), and 11(d) illustrate simultaneous use of BDP1 and BDP2 of two-layered antenna structures each having a predetermined angle (e.g. 60 degrees) between two layered antennas. FIGS. 11(e), 11(f), 11(g), and 11(h) illustrate single use of BDP1 or BDP2 of two-layered antennas having the same angle. In FIG. 11(a), BDP1 of a first layered antenna uses CC#1 for signal transmission and BDP2 of a second layered antenna uses CC#2 for signal transmission. In FIG. 11(b), CCs that BDPs use for signal transmission are interchanged as compared with FIG. 11(a). That is, BDP1 uses CC#2 and BDP2 uses CC#1. In FIG. 11(c), BDP1 and BDP2 uses CC#1 and CC#3, respectively, and in FIGS. 11(d), BDP1 and BDP2 uses CC#3 and CC#1, respectively. It can be seen in FIGS. 11(c) and 11(d) that the size of an area serviced using CC#3 is different from a service area shown in FIGS. 11(a) and 11(b). Such a difference in the service area may be generated by various factors including a difference between powers for transmitting two CCs and a difference in path attenuation between CCs. For example, when path attenuation generated by a difference between frequency bands used by CCs is considered, CC#1 and CC#2 show an example of using center frequencies of contiguous bands and areas of BDP1 and BDP2 have no difference as illustrated in FIGS. 11(a) and 11(b). CC#3 shows an example of using a center frequency of a higher band than CC#1 and CC#2. In FIGS. 11(c) and 11(d), a coverage area of a BDP on CC#3 is smaller than that on CC#1 or CC#2. The case where a BDP area on CC#3 is larger than that on CC#1 or CC#2 by using a frequency band of CC#3 lower than that on CC#1 or CC#2 may be considered. FIGS. 11(e) and 11(f) illustrate signal transmission of two layered antennas using only one of BDP1 and BDP2. In FIGS. 11(g) and 11(h), two-layered antennas use only one of BDP1 and BDP2 and it may be appreciated that BDP areas are different because CC#1 and CC#3 have different frequency bands.

By selectively using a plurality of BDPs, which can be implemented by an antenna apparatus having a plurality of layered antennas, on resources of various cellular mobile communication systems including time, frequency, CC, etc., signal transmission based on the proposed beam switching can be performed. If a different BDP on each frequency-domain resource is allocated, there is an advantage of operating in a state that a UE cannot recognize information about allocation of a BDP on each frequency-domain resource. Accordingly, a system may operate without signaling overhead for additionally informing the UE of BDP allocation information per frequency resource and, in this case, the UE recognizes a channel to which a different BDP per frequency-domain resource is allocated as a channel having very strong frequency selectivity. Especially, such frequency-domain beam switching is useful in a scheme using signal processing in a frequency domain such as Frequency Division Multiple Access (FDMA) or Orthogonal FDMA (OFDMA). That is, since signals of a transmitter that the UE desires to receive are transmitted through a channel using a plurality of independent frequency-domain resource durations, frequency-domain beam switching for allocating different BDPs according to a frequency-domain resource is easy to implement.

Figure 12:
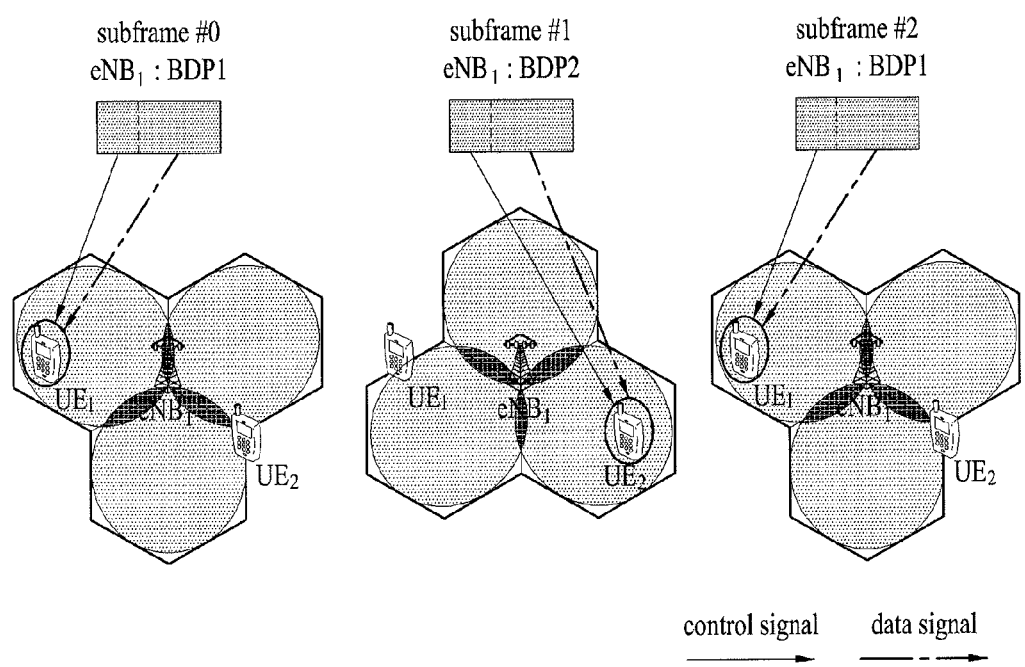
FIG. 12 illustrates a wireless communication system according to an embodiment of the present invention.

Meanwhile, unlike frequency-domain beam switching, time-domain beam switching may be used by applying different BDPs to signals transmitted by the transmitter over time. Time-domain beam switching can be implemented with low complexity even in Code Division Multiplex Access (CDMA) or Time Division Multiplex Access (TDMA) as well as FDMA or OFDMA. A combination of time-domain beam switching and frequency-domain beam switching may be applied. In addition, since time-domain beam switching exhibits uniform reception performance over all frequency bands, it is preferably applied to a PDCCH signal in the afore-mentioned LTE(-A) system. Hereinafter, a unit time resource duration having arbitrary length is referred to as a subframe and is defined as a minimum time duration capable of maintaining one BDP without change to another BDP in transmitting a signal to which time-domain beam switching is applied. One subframe may include an arbitrary number of control regions and data regions and subframes transmitted over time may be indexed as subframe#0, subframe#1, etc. Although a beam switching based signal transmission method will be described hereinafter under the assumption of a subframe including one control region and one data region shown in FIG. 3, the proposal of the present invention is not limited thereto as described above. When two BDPs are given, for example, as illustrated in FIG. 10, different subframes using BDP1 and BDP2 may be configured so that physical beam switching may be generated over time. If signal transmission is performed using the proposed beam switching, there is an advantage of transmitting signals to UEs that are geographically located at different positions while controlling ICI. FIG. 12 illustrates a situation in which BDP1 and BDP2 are sequentially applied in three successive subframes (subframe#0, subframe#1, and subframe#2) over time. UEs ($UE_1$ and $UE_2$) are all positioned in a service area of an eNB ($eNB_1$). In subframe#0, $eNB_1$ uses BDP1 and $UE_1$ performs UL/DL transmission/reception with $eNB_1$. In subframe#0, $UE_2$ is located at a cell edge and, as a result, $UE_2$ is subjected to strong interference from eNBs of neighboring cells. Therefore, in subframe#0, $eNB_1$ does not schedule $UE_2$ and allocates more resources to UEs capable of generating good transmission efficiency. In subframe#1, $eNB_1$ uses BDP2. In this case, $UE_2$ performs UL/DL transmission/reception with $eNB_1$ without interference from neighboring cells. In subframe#2, $eNB_1$ uses BDP1 again and schedules $UE_1$ to perform UL/DL transmission.

The proposed time-domain beam switching may be achieved as a method for sequentially allocating different BDPs to subframes by a prescheduled fixed sequence or as a method for flexibly allocating an optimal BDP to subframes according to a given condition at every transmission point.

Figure 13:
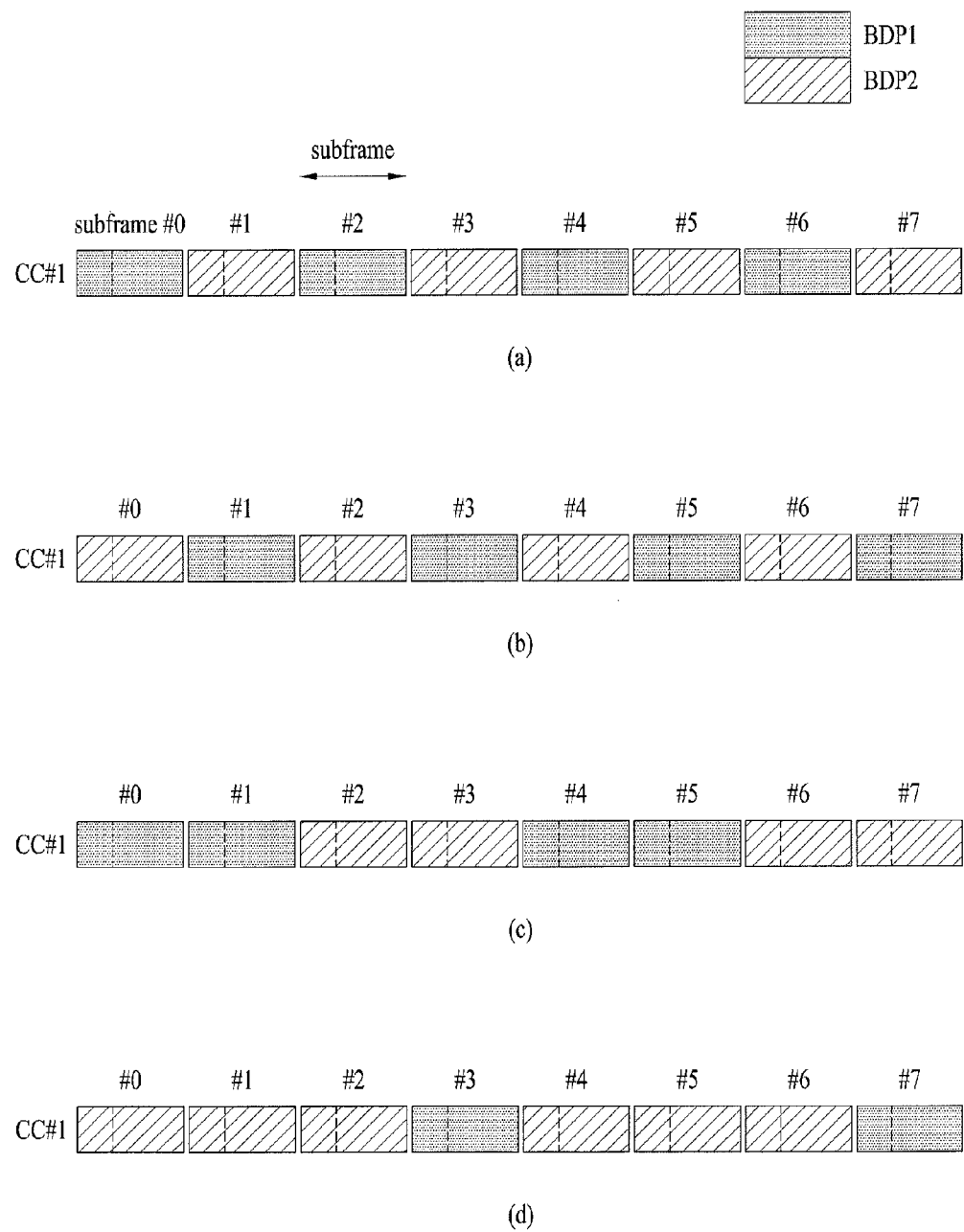
FIG. 13 illustrates a BDP allocated to each subframe according to an embodiment of the present invention.

FIG. 13 illustrates a fixed sequence for allocating BDP1 and BDP2 to subframes. That is, for example, FIGS. 13(a) and 13(b) illustrate sequences sequentially using BDP1 and BDP2 in two contiguous subframes and the sequences are repeatedly applied in neighboring subframes. One sequence may include an arbitrary number BDPs and arbitrary types of BDPs. For example, in FIGS. 13(c) and 13(d), four successive subframes are a basic unit of a fixed sequence. FIG. 13(c) illustrates a sequence sequentially using two BDP1s and two BDP2s and FIG. 13(d) illustrates a sequence sequentially using three BDP2s and one BDP1.

Meanwhile, in a flexible sequence, a BDP to be used in an arbitrary subframe may be adaptively changed according to an operation environment of a system, as illustrated in FIG. 14. Referring to FIGS. 14(a) and 14(b), the fixed sequence shown in FIG. 13 is not present and the same sequence is not repeated in contiguous subframes.

Especially, if the system uses such time-domain beam switching, the UE recognizes a signal beam as a channel having a powerful shadowing effect according to a period of beam switching generation time. At this time, if a serving transmission station uses a BDP having directionality towards a geographical location of a specific UE for signal transmission, a Radio Resource Measurement (RRM) report value, such as Reference Signal Received Power (RSRP)/Reference Signal Received Quality (RSRQ), measured by the UE and transmitted to the serving transmission station, has a very high magnitude relative to the case when a BDP having no directionality is used. Accordingly, transmission/reception related to control and data signals between the serving transmission station and the UE is preferably performed when a BDP having directionality from the serving transmission station to a geographical position of the UE is used. However, if a beam is formed at a location mis-aligned with a geographical position of a specific UE, an RRM report, such as RSRP/RSRQ, performed by the UE, has a very low magnitude relative to the case when a BDP having no directionality is used. Accordingly, the system receiving such a report has a high possibility of determining handover to another neighboring cell with respect to the UE. In particular, as the period of time-domain beam switching is shortened, attempts to perform unnecessary handover are increased, thereby resulting in severe system overhead. Accordingly, the present invention is devised to perform effective time-domain beam switching while preventing an unnecessary handover attempt by transmitting information about time-domain beam switching to the UE. Instead of measuring RSRP/RSRQ for an RRM report in all subframes, the UE measures RSRP/RSRQ only for specific subframes to which a BDP preferred by the UE is applied, using information about beam switching received from the system, and reports the measured RSRP/RSRQ to the system. Here, the BDP preferred by the UE refers to a BDP having good or best DL channel quality indicated by RSRP/RSRQ measured by the UE. The system determines handover of the UE based on an RRM report such as RSRP/RSRQ measured with respect to specific subframes to which a BDP preferred by the UE is applied. The RRM report may be used to determine not only handover but also various signal transmission related parameters including coding rate, modulation order, the number of spatial multiplexing layers, etc. The proposed beam switching information transmission method may be separately achieved as the case where beam switching using a fixed sequence is performed and the case where beam switching using a flexible sequence is performed.

First, if time-domain beam switching is performed using a fixed sequence, the system and the UE should share information about a set $\{S_1, S_2, \ldots, S_L\}$ of predetermined BDP sequences. In this case, an element $S_i$ is a BDP sequence and denotes a vector including information about indexes of BDPs allocated sequentially to contiguous subframes. For example, if elements in a set {S1, S2, S3, S4} sequentially denote the sequences illustrated in FIG. 13, S1=[1, 2], S2=[2, 1], S3=[1, 1, 2, 2], and S4=[2, 2, 2, 1]. Hence, the system should inform the UE of which BDP sequence is selected for beam switching from among elements in the set of the BDP sequences. In addition, the sequence may be provided to the UE in the form of a bitmap. An index of a subframe in which application of beam switching based on the selected BDP sequence is started should be prescheduled between the system and the UE or may be indicated to the UE through additional signaling. For example, when information about the selected BDP sequence is transmitted in subframe#k, a location at which beam switching is started is subframe#(k+c) (where c is a positive integer including 0). Accordingly, as described earlier, a value determined between the system and the UE may be used as the value c or a method for transmitting information about the value c to the UE during transmission of information about the BDP sequence may be used.

If time-domain beam switching is performed using a flexible sequence, a set of predefined sequences such as the set of the BDP sequences cannot be used. At this time, information about flexible sequences is transmitted to the UE in subframe#k. The flexible sequence includes information about a BDP of each of subframes ranging from subframe#(k+c) to subframe#(k+c+d). The flexible sequence may be defined as $\overline{S}_k = [s_k(0) \, s_k(1) \ldots s_k(d)]$ (where $s_k(j)$ is index information of a BDP to be applied in subframe#(k+j)). For example, when c=0 and d=3, $\overline{S}_0=[1\ 1\ 1\ 1]$ and $\overline{S}_4=[2\ 2\ 1\ 2]$ in FIG. 14(a) and $\overline{S}_0=[2\ 2\ 2\ 1]$ and $\overline{S}_4=[2\ 1\ 1\ 2]$ in FIG. 14(b). Accordingly, a transmitter utilizing time-domain beam switching using a flexible sequence transmits information about the flexible sequence to the UE. In this case, values of c and d may be predetermined between the system and the UE. The transmitter may determine the values of c and d according to situation and informs the UE of the values through additional signaling.

Further, instead of the fixed sequence and the flexible sequence, a set of specific subframes consisting of at least one subframe may be defined and BDPs to be applied to the subframe set may be allocated. In other words, an eNB may transmit information (e.g. identifiers) about BDPs to be applied to a plurality of subframe sets to the UE and the UE may measure DL signals based on the information.

As opposed to a method for informing the UE of information about a BDP sequence allocated to a plurality of contiguous subframes, if beam switching is generated in a specific subframe and a BDP which is different from a BDP applied to subframes prior to occurrence of beam switching is applied to subframes after occurrence of beam switching, a method for informing the UE of information about beam switching in the specific subframe may be used. That is, if beam switching to BDPm is performed in subframe#(k+c) (where c is a positive integer including 0), this may be previously indicated to the UE in subframe#k. A message for informing the UE that beam switching occurs includes index information m of a BDP. If a value of c is not determined between the system and the UE or a flexible value of c needs to be applied, the values m and c are simultaneously included in the message to be transmitted. Meanwhile, in a subframe in which information about beam switching using the fixed or flexible sequence is transmitted, the beam switching information may be transmitted using all BDPs possessed by a serving transmission station in order to transmit the beam switching information to all UEs within the cell coverage. Alternatively, a method for sequentially transmitting information about BDP sequences in a plurality of subframes using different BDPs may be used. At this time, each UE may receive the beam switching information in a subframe using a BDP preferred thereby.

In addition to the above-mentioned methods, a method for informing the UE which BDP is applied in each subframe may be applied in the form of a subframe bitmap of a specific length (e.g. 40 bits during 40 ms or 70 bits during 70 ms). The above information may be indicated through information expressed as a specific subframe period and a subframe offset. Furthermore, it should be noted that various modifications are also within the scope of the present invention.

Meanwhile, the UE receiving a service from the transmission station applying time-domain beam switching receives information about the aforementioned fixed or flexible sequence. The UE measures signal quality in each DL subframe using a different BDP based on the information about the sequence received from the serving transmission station. The UE compares the measured signal qualities and determines a BDP applied to a subframe having the best signal quality as a preferred BDP. To guarantee good DL signal quality, UEs that have performed the above process may communicate with the serving transmission station in subframes to which BDPs preferred thereby are applied. Accordingly, the present invention proposes that index information for a BDP preferred by each UE be reported to the serving transmission station of the corresponding UE. Each transmission station collects the index information of preferred BDPs reported by UEs and uses the index information for scheduling, thereby transmitting and receiving a control signal or a data signal in time resource durations to which BDPs preferred by the UEs are applied. If necessary, each UE may recognize beam switching information of transmission stations generating interference in a neighboring cell in addition to the beam switching information of a serving transmission station thereof. The UE may select a non-preferred BDP generating the most severe interference with respect thereto based on the beam switching information of the interference transmission stations. The UE transmits non-preferred BDP information for the interference transmission stations to the serving transmission station or the interference transmission stations.

Each transmission station may perform effective scheduling using the non-preferred BDP information for interference transmission stations in a neighboring cell, reported by each UE, as well as the preferred BDP information within the corresponding cell coverage, reported by each UE. That is, in a time resource duration in which a control signal or a data signal for a specific UE is transmitted, the transmission station is configured to use the preferred BDP of the UE and neighboring cell transmission stations are configured not to use non-preferred BDPs reported by the UE. To this end, the transmission station needs to exchange information about beam switching in each frequency-domain or time-domain resource with the neighboring cell transmission stations. Each transmission station collects beam switching information thereof and beam switching information of the neighboring cell transmission stations and schedules the UE in time and frequency resource durations in which a corresponding serving transmission station uses a BDP preferred by a specific UE and simultaneously neighboring transmission stations do not use a BDP not preferred by the specific UE. Alternatively, each transmission station may schedule the UE first in an arbitrary resource duration and may allocate a BDP preferred by the UE in the corresponding resource duration. In this case, in order to reduce interference from neighboring transmission stations, the neighboring transmission stations may be requested to refrain from using a non-preferred BDP in a resource duration in which the UE is scheduled.

As described above, in a system to which proposal of the present invention is applied, each UE determines a serving transmission station based on DL signal quality in a subframe using a BDP preferred thereby. On the other hand, in a legacy LTE(-A) system for example, reception strength of a Cell-specific Reference Signal (CRS) designed with a unique pattern of each transmission station is used as a criterion for determining the serving transmission station. When the proposed method is applied to the LTE(-A) system, a CRS to which a different BDP is applied in each subframe may be transmitted from a transmission station. Accordingly, each UE may measure signal strength of CRSs only in specific subframes to which a BDP preferred thereby is applied, instead of measuring signal strength in every subframe, and may report the measured signal strength to the system in the form of an RRM report such as RSRP/RSRQ. The system may use the RRM report value such as RSRP/RSRQ measured in specific subframe durations to which a BDP preferred by a UE is applied to determine handover of the corresponding UE to a neighboring cell transmission station. In addition, the corresponding UE detects/receives a PDCCH in order to check whether the UE has been scheduled in a corresponding subframe. If the UE has been scheduled in the subframe, the UE additionally receives a data signal through a PDSCH. If it is assumed that, in a subframe in which a BDP other than a BDP preferred by a specific UE is used, the serving transmission station does not perform transmission and reception for the UE, the UE may reduce power consumption caused by unnecessary signal transmission/reception by transitioning to a standby state in the corresponding subframe. Namely, for example, the UE may raise a power saving effect thereof by arbitrarily transitioning to the standby state in a subframe in which a BDP other than a BDP preferred thereby is used. Whether the serving transmission station permits such UE behavior may be semi-statically signaled in advance through a higher-layer signal (e.g. RRC signaling). For example, if information about flexible or fixed time-domain beam switching is transmitted to the specific UE (or if the specific UE has reported preferred/non-preferred BDP information and the transmission station has transmitted an acknowledgement response), the UE may assume that there are no control signals (e.g. PDCCHs) directed thereto in subframes to which BDPs other than a preferred BDP are applied. Accordingly, the UE may transition to the standby state. To efficiently support such an operation, the information about flexible or fixed time-domain beam switching may be preferably transmitted at a long period.

Figure 15:
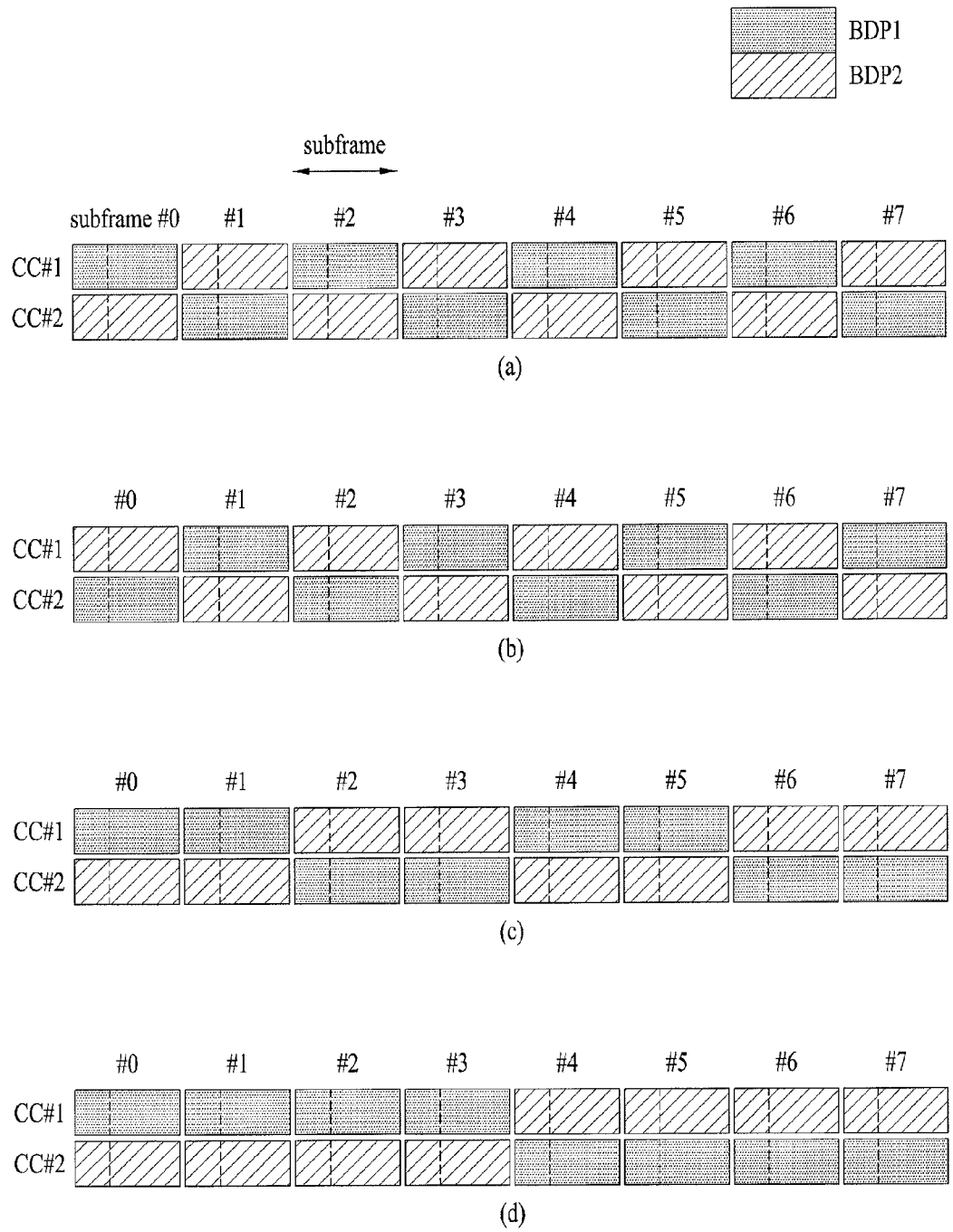
FIG. 15 illustrates a BDP allocated to each subframe of carrier aggregation according to an embodiment of the present invention.

Even in the case where a plurality of CCs is used, including the case where a single CC is used, a signal transmission method based on the proposed beam switching may be generally extended and applied. For example, FIGS. 15(a) and 15(b) exemplarily illustrate the case where a sequence sequentially using BDP1 and BDP2 is fixedly repeated in two contiguous subframes. In the illustrated examples of FIGS. 15(c) and 15(d), sequences of 4 or 8 subframes are fixedly repeated. In this case, a sequence is applied such that CCs in the same subframe may use different BDPs. Through such a method, the BDPs of FIG. 11(a) and BDPs of FIG. 11(b) are alternately repeated in each subframe and may be used for signal transmission.

FIG. 16 illustrates a multi-CC transmission method using BDPs allocated as a flexible sequence. In this case, since various combinations of BDPs may be allocated in each subframe as compared with the fixed sequence, signal transmission using various types of BDPs may be performed.

FIG. 17 illustrates examples of applying an embodiment of the present invention to a system using multiple CCs. In FIG. 17, $eNB_1$ transmits signals using multiple CCs CC#1 and CC#2 in three successive subframes subframe#0, subframe#1, and subframe#2 over time. It is assumed that $UE_1$, $UE_2$, and $UE_3$ are all located in a service area of $eNB_1$, $UE_1$ and $UE_3$ are able to receive CC#1 only, and $UE_2$ is able to receive both CC#1 and CC#2. It is also assumed that all UEs use CC#1 as a primary CC (PCell) as in the LTE-A system and, therefore, a scheduling message for receiving a data signal is received only from a control signal region of CC#1 which is the PCell. In subframe#0 and subframe#2, $UE_1$ transmits and receives a control signal and a data signal through CC#1 to which BDP1 is applied while reducing interference from a neighboring cell. Meanwhile, in all subframes, $UE_2$ may transmit and receive broadband signals through a Carrier Aggregation (CA) technology by simultaneously using CC#1 to which BDP1 is applied and CC#2 to which BDP2 is applied. However, $UE_3$ using CC#1 only cannot perform effective communication with a serving transmission station in subframe#0 and subframe#2. Therefore, for such a UE, beam switching is performed in subframe#1 and $UE_3$ transmits and receives signals with the serving transmission station through CC#1 to which BDP2 is applied. As illustrated, a system using multiple CCs needs to perform beam switching in various manners for effective signal transmission/reception, according to a geographical location of each UE, reception capabilities per CC, and the type of a PCell for each UE.

Figure 18:
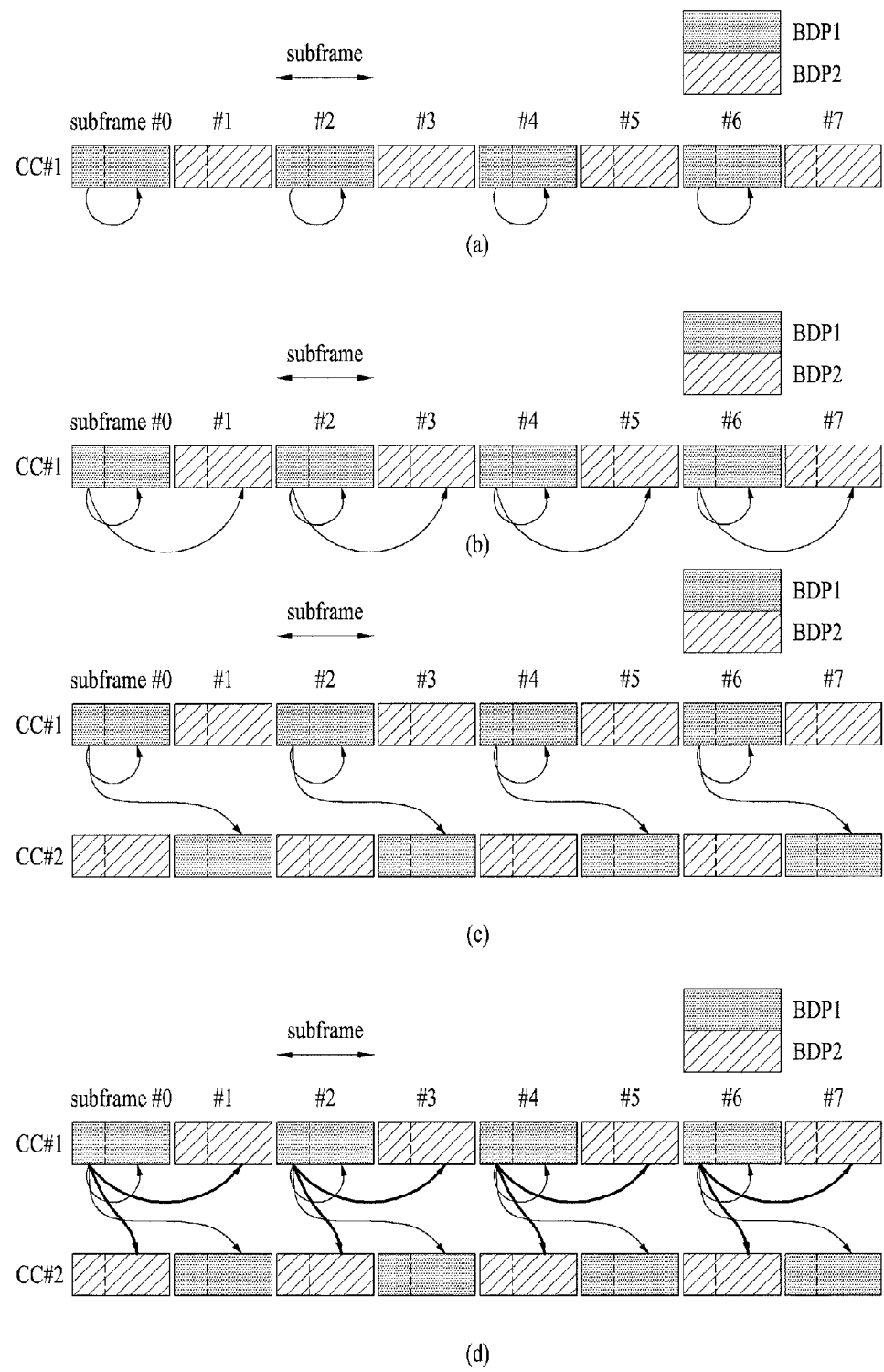
FIG. 18 illustrates a BDP allocated to each subframe of carrier aggregation and a DL scheduling scheme according to an embodiment of the present invention.

A plurality of control regions and a plurality of data regions may be included in one subframe defined as a unit time resource interval having an arbitrary length. Scheduling information which should be transmitted to the UE by the system is generally included in the control region and each UE may recognize whether scheduling thereof is performed and recognize location of the data region therefor, through the scheduling information. Data regions indicated by the scheduling information in legacy systems are restricted to data regions in the same subframe#k as the control region in which the scheduling information is included as shown in FIG. 18(a). However, in a proposed inter-subframe scheduling, a data region indicated by specific scheduling information is configured to be present in an arbitrary subframe# (k+b) (where b is a positive integer including 0). For example, in FIG. 18(b), scheduling information in a control region included in subframe#0 indicates data regions included in subframe#0 and subframe#1. According to the proposed scheduling scheme, location information of data regions is included in a specific subframe#(k+b) as in the existing scheduling information. In addition, index information (k+b) of subframes including data regions is also included. In a system using multiple CCs, the proposed inter-subframe scheduling may be applied and used together with an inter-CC scheduling scheme. That is, a data region indicated by scheduling information may be located in a subframe and a CC which are different from a subframe and a CC in which the scheduling information is included. In FIG. 18(d) for example, scheduling information in a control region of CC#1 included in subframe#0 simultaneously indicates data regions CCs CC#1 and CC#2 included in subframe#0 and subframe#1.

For inter-subframe scheduling, a new scheduling message is needed and the message should include index information of subframe#(k+b) in which next UL or DL transmission is to be performed and information x(k+b) about the location of a data region in the corresponding subframe. To inform the UE of index information of subframe#(k+b) to be scheduled next, a relative difference index b from subframe#k including a corresponding scheduling message may be transmitted to the UE. In addition, information X(k+b) as to in which location of subframe#(k+b) a data region is included is also transmitted to the UE. For example, if a subframe including a scheduling message is subframe#1 and if a position in which a data region indicated by the scheduling message is included is subframe#4, a relative difference value 3 is included in the scheduling message to be transmitted to the UE. To effectively transmit such difference index information to the UE, subframes in which data regions indicated by the scheduling message transmitted in subframe#k are included may be expressed as a stream y=y1 y2 . . . yB consisting of B bits. Each bit yB of the bit stream indicates whether a data region indicated by the scheduling message is included in subframe#(k+b−1). For example, when B is 4, an inter-subframe scheduling message included in subframe#k may be transmitted together with a bit stream y=1010 to indicate that data indicated by the scheduling message is included in subframe#k and subframe#(k+2).

Figure 19:
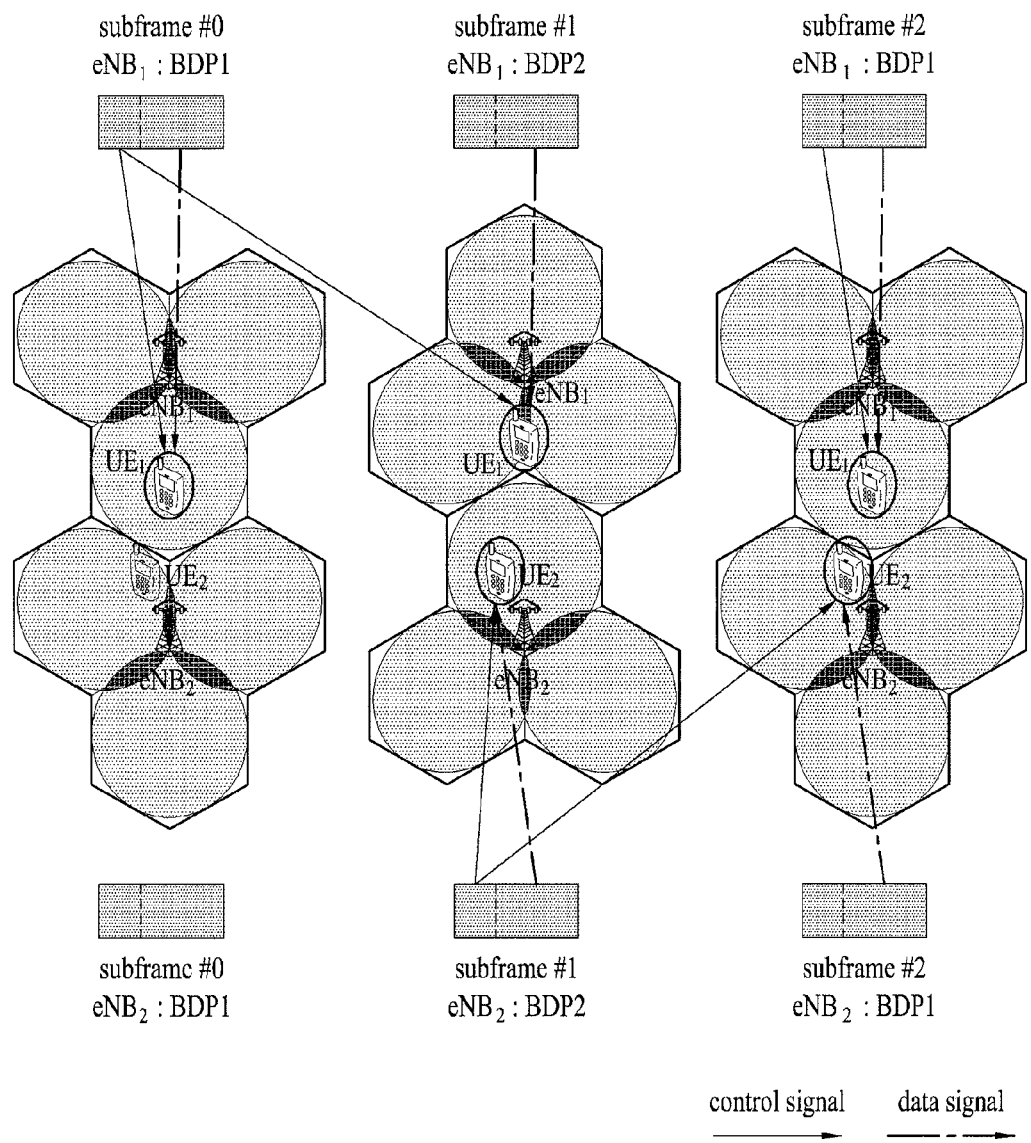
FIG. 19 illustrates a wireless communication system to which a BDP allocated to each subframe of carrier aggregation and a DL scheduling scheme are applied, according to an embodiment of the present invention.

FIG. 19 illustrates a method for successively receiving data in contiguous subframes using inter-subframe scheduling in a system to which time-domain beam switching is applied. In FIG. 19, if $eNB_1$ and $eNB_2$ use the same CC CC#1, signal transmission efficiency is lowered at a cell edge of the two eNBs due to ICI. To control ICI, neighboring eNBs may perform beam switching in every subframe. Referring to FIG. 19, $eNB_1$ transmits, in subframe#0, control information necessary for receiving data in subframe#0 and subframe#1 to $UE_1$ using BDP1. Accordingly, $UE_1$ may successively receive data in subframe#0 and subframe#1 by receiving control information in subframe #0. In subframe#1, $eNB_2$ may transmit control information necessary for receiving data in subframe#1 and subframe#2 to $UE_2$.

Accordingly, $UE_2$ may successively receive data in subframe#1 and subframe#2 by receiving control information in subframe #1. $UE_1$ may continue to receive data even in subframe#1 using the control information received in subframe#0. Especially, such examples are useful when a UE requiring data traffic such as real-time motion pictures desires to obtain an effect of controlling ICI by applying beam switching based on multiple BDPs only in a control region while continuously receiving data in successive subframes by fixing a BDP of a data region.

FIG. 20 illustrates an application example of an inter-subframe scheduling scheme in a situation in which signals are transmitted using CA. If a PCell of each UE is determined, a UE may receive control information including a scheduling message only from the PCell upon transmitting and receiving signals using CA. In FIG. 20, a PCell of $UE_1$ is CC#1 and $UE_1$ prefers BDP1. Additionally, a PCell of $UE_2$ is CC#2 and $UE_2$ prefers BDP1. $UE_1$ and $UE_2$ may transmit and receive signals in both CC#1 and CC#2 and support CA. In subframe#0, CC#1 uses BDP1 and CC#2 uses BDP2. However, subframe#1 in which beam switching is generated, CC#2 uses BDP1 and CC#1 uses BDP2. Therefore, although $UE_1$ receives control information transmitted using BDP1 on CC#1 which is the PCell through subframe#0, it cannot obtain control information including scheduling information through subframe#1 using BDP2 on CC#1. Accordingly, when control information is transmitted to $UE_1$ in subframe#0, eNB1 may use an inter-subframe scheduling scheme so that $UE_1$ may successively receive data even in subframe#1. In subframe#1, $UE_2$ receives control information and data transmitted using BDP1 preferred thereby on CC#2 which is the PCell and the control information includes information for data reception in subframe#2 for inter-subframe scheduling. Even in the example illustrated in FIG. 20, if beam switching and inter-subframe scheduling are used as in FIG. 19, successive UL and DL transmission may be performed in every subframe.

When the above proposed inter-subframe scheduling is used, beam switching based signal transmission may be applied by the same or different scheme to a control region and a data region. If the same BDP application scheme is applied, the same BDP is applied to the control region and the data region included in one subframe. If beam switching occurs in contiguous subframes, the same BDP is also applied to the control and data regions in the contiguous subframe. For example, BDP1 may be applied to both the control region and data region in one subframe and BDP2 may be applied to both the control region and data region in a contiguous subframe in which beam switching occurs. On the other hand, if a different BDP application scheme is applied, different BDPs may be applied to the control region and the data region included in one subframe and, furthermore, beam switching of the data and control regions may be independently generated. For example, BDP1 may be applied to the control region in one subframe and BDP2 may be applied to the data region in the same subframe. When beam switching is generated in the data and control regions of a neighboring subframe, BDP2 and BDP1 are applied to the control regions and data regions, respectively. If beam switching is generated only in the control region of the neighboring subframe, BDP2 is applied to both the control region and the data region.

FIG. 21 illustrates an application example of a BDP to a control region and a data region by a different scheme. BDP1 is used for transmission of the control region in subframe#0 and, in this case, $UE_1$ receives a scheduling message. In addition, in subframe#0, control information necessary for $UE_1$ to receive data in subframe#1 is also transmitted using inter-subframe scheduling. In subframe#1, BDP2 is used for transmission of the control region and, in this case, $UE_2$ receives a scheduling message. Here, even in subframe#1, control information necessary for $UE_2$ to receive data in subframe#2 is also transmitted using inter-subframe scheduling. The inter-subframe scheduling scheme used in subframe#0 and subframe#1 is applied in the same manner to subsequent subframes. Meanwhile, data is always transmitted through a BDP in the overlapping form of BDP1 and BDP2 in every subframe.

FIGS. 22(a) and 22(b) illustrate scheduling of control regions and data regions for $UE_1$ and $UE_2$. $UE_1$ and $UE_2$ may receive control information through one of BDP1 and BDP2 but receive data through BDP1 in all subframes. If no beam switching is applied to the data region transmitted always using an overlapping form of the two BDPs and beam switching is applied only to the control region, the UE may receive control information with high quality using a BDP preferred thereby.

For example, in FIG. 21, while $UE_2$ is decreased in transmission efficiency due to ICI in a subframe to which BDP1 is applied, $UE_2$ ca n obtain relatively good transmission efficiency in a subframe to which BDP2 is applied. Accordingly, when beam switching is applied only to the control region, ICI can be effectively controlled. Especially, as described previously, the UE has an advantage of receiving control information with high quality while controlling an influence of interference from a neighboring cell by transmitting not only preferred BDP information but also non-preferred BDP information to the system. Such a scheme capable of continuously receiving data in successive subframes may be used as a method for efficiently providing a service such as real-time streaming.

Moreover, it is possible to transmit signals in the form of applying a BDP by a different scheme in a control region and a data region even on UL. On UL, the above-described BDP may be a reception BDP of a reception eNB, i.e. a BDP for a UL signal transmitted by the UE. For example, an eNB transmits UL scheduling grant related control information in a subframe to which a BDP preferred by the UE is applied. The UL scheduling grant related control information may indicate in which subframe (e.g. a subframe in which a specific reception BDP of the reception eNB can be received with good UL signal quality) a corresponding UE is to perform UL transmission. For instance, when a UL scheduling grant is received in an n-th subframe, a parameter value k indicating that UL transmission of the UE should be performed in an (n+k)-th subframe may be transmitted.

As another scheme, information about subframes (e.g. subframe indexes, etc.) to which a reception BDP of an eNB preferred by a specific UE is applied may be previously transmitted through a higher-layer signal as in the above schemes on DL and, upon receiving a UL scheduling grant in the n-th subframe, the UE may perform a predefined operation for UL transmission in a subframe to which a reception BDP of an eNB preferred by the UE is applied first, among subframes after an (n+k)-th subframe in a situation where the specific value k is used. That is, an operation may be predefined such that UL transmission may be performed in a first subframe, among subframes corresponding to subframe index information indicating all subframes after a UL transmission time of the UE in an existing scheme caused by a UL scheduling grant and to subframe index information indicating subframes to which the preferred reception BDP is applied (e.g. this information may be expressed as a subframe bitmap or a specific period and subframe offset).

The aforementioned beam switching related signaling and UE behavior should be identically applied in relation to beam switching in the control region, irrespective of whether beam switching is applied to the data regions. The control region includes a CRS having a unique characteristic for each transmission station, in addition to control information necessary for transmitting and receiving data. For beam switching in the control region, the aforementioned information about the fixed or flexible BDP sequence should be transmitted to the UE. The UE may determine a preferred BDP based on the received BDP sequence information and may cause an eNB to determine handover of the corresponding UE to a proper neighboring cell through an RRM report such as RSRP/RSRQ based on a measurement value of signal quality in subframes to which the preferred BDP is applied.

In addition, information about preferred BDPs and non-preferred BDPs selected by the UE is transmitted to the system and the system uses the information for scheduling for radio resource and BDP allocation to the UE. Especially, if beam switching is applied only to a control region and a fixed BDP is used in a data region, the above proposed inter-subframe scheduling can be effectively used. That is, a UE, that desires to successively receive data signals in contiguous subframes in which beam switching in the control region is generated, simultaneously performs next scheduling for a plurality of subframes#(k+b) (where b is a positive integer including 0) in the control region of subframe#k to which a BDP preferred by the UE is allocated. The UE scheduled in the control region of subframe#k may receive data in the data regions in subframes indicated by a corresponding scheduling message irrespective of whether control signals are received.

Beam switching in the data region may vary with a signal reception scheme of the UE. For example, when channel estimation for receiving data signals using a cell-specific unique signal such as a CRS in the LTE(-A) system is performed, if the CRS is transmitted using a BDP different from that applied to a data region, a channel state (channel quality) estimated using the CRS by the UE becomes different from channel state (channel quality) through which actual data is transmitted and, as a result, an error in receiving a data signal is abruptly increased. Accordingly, a method for equalizing a type of a BDP used for the CRS and a type of a BDP used in the data region may be used.

However, if a BDP applied to transmission of the CRS is different from a BDP applied to transmission of the data region, the UE may estimate a difference value between the two BDPs by recognizing the types of the two BDPs, thereby receiving a data signal. For example, it is assumed that a channel value estimated using the CRS transmitted using $BDP_m$ is $h_m$ and a data region uses $BDP_n$. To receive signals in the data region, a channel value $h_n$ estimated using a CRS transmitted using $BDP_n$ is needed. Therefore, in order to obtain the channel value $h_n$, the UE estimates a difference value $d_{m,n}$ between the two BDPs to calculate $h_n = h_m + d_{m,n}$ and uses $h_n$ to receive data transmitted using $BDP_n$. That is, when PDSCH reception according to CRS-based transmission mode 4 in the LTE(-A) system is considered as an example, the UE may estimate a difference value between the two BDPs by additionally performing channel estimation through a CRS in each subframe to which a different BDP is applied as described above and, in this case, a precoding codebook index indicated explicitly by a transmission eNB may be used as follows.

A precoding codebook index, which is based on CSI feedback (e.g. RI/PMI/CQI) reported using a CRS in subframes in which a corresponding UE decodes DL control information and is compensated for by an eNB so as to be applied to a channel estimation value caused by a CRS to which a different BDP is applied during actual PDSCH transmission, may be transmitted. The precoding codebook index may be included in DL control information. That is, if this scheme is applied, the UE may perform only CSI feedback based on a CRS in a subframe in which control information is decoded. For demodulation in a subframe in which a PDSCH is actually received, an operation for estimating a difference value between the two BDPs and compensating for the difference value should be performed. The eNB may determine a proper precoding codebook index for a time to actually transmit the PDSCH and inform the UE of the precoding codebook index through DL control information, under the assumption of such UE behavior.

A precoding codebook index which is finally determined by the eNB may be transmitted, based on CSI feedback (e.g. RI/PMI/CQI) reported using a CRS in subframes in which DL control information is not decoded (e.g. subframes in which a control signal is transmitted and to which a non-preferred BDP is applied). That is, if this scheme is applied, the UE does not perform CSI feedback based on the CRS in subframes (e.g. subframe set 1) in which control information is decoded and the UE may perform CSI feedback based on the CRS in subframe indexes (e.g. subframe set 2) in which the PDSCH is to be received. Alternatively, an operation scheme for individually reporting CSI feedback for the two subframe sets 1 and 2 may be applied. A scheme may be applied in which the eNB informs the UE of a subframe set for which CSI feedback is to be performed, semi-statically or dynamically (e.g. by a specific DCI format).

A UE that reports a preferred BDP to a serving transmission station and reports a non-preferred BDP to neighboring transmission stations may estimate a geographic position of the UE by collecting BDP information. As illustrated in FIG. 23(a), since each BDP has directionality, whether a BDP is preferred by the UE may be determined according to a geographical location of each UE as illustrated in FIG. 23(b). Namely, since a signal transmitted using a BDP is a beam forming signal having directionality towards specific geographical locations, a BDP of a serving transmission station, preferred by a specific UE, is mainly determined according to a geographical location of the corresponding UE. Moreover, a BDP of an interference transmission station, which is not preferred by a specific UE, is also determined according to directionality to a geographical location of the corresponding UE. Accordingly, information about the preferred BDP of the serving transmission station and the non-preferred BDP of the interference transmission station, reported by the UE, may be used to estimate geographical information of UEs together with directionality information of BDPs used by the serving transmission station and the interference transmission station. FIG. 23(c) illustrates two UEs receiving services from a transmission station $eNB_1$. The two UEs estimate $BDP_a$ from a serving transmission station as a preferred BDP and report the estimated BDP to the system. The two UEs also report $BDP_b$ and $BDP_c$ estimated from an interference transmission station $eNB_2$ as non-preferred BDPs. The system estimates a region in which geographical locations of the BDPs overlap as illustrated in FIG. 21(c) as a geographical location of a corresponding UE, based on geographical location information corresponding to the preferred and non-preferred BDPs reported by the two UEs. On the contrary, a BDP which is preferred by the UE and a BDP which is not preferred by the UE may be estimated based on geographical location information of UEs discerned by the system. In the LTE(-A) system, a Positioning RS (PRS) may be used to obtain geographical location information of the UE. If it is impossible to estimate location by the PRS, the present embodiment may be used. As described above, since each BDP has unique directionality, BDPs preferred or not preferred by the UE may be determined according to a geographical location of the corresponding UE. Consequently, location information estimation of the UE using information about preferred and non-preferred BDPs reported by the UE can be efficiently used when the UE is unable to estimate location information or when location information is inaccurate. If it is possible to estimate accurate location information of the UE, the system may directly estimate information about preferred BDPs of the serving transmission station and non-preferred BDPs of the neighboring interference cell transmission stations, without an additional signaling message from the corresponding UE.

Figure 24:
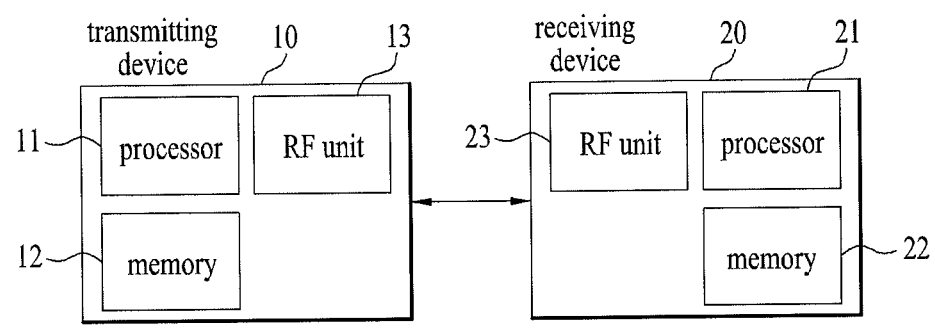
FIG. 24 is a block diagram of devices to which embodiments of the present invention are applicable.

FIG. 24 is a block diagram of an apparatus configured to implement a UL transmission related operation according to an exemplary embodiment of the present invention. A transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to perform the present invention. The processors 11 and 21 may be called controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs coding and modulation with respect to signals and/or data which are scheduled by the processor 11 or by a scheduler connected to the processor 11 and are transmitted to the exterior and transmits the coded and modulated signals and/or data to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Media Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives radio signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single radio channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In the exemplary embodiments of the present invention, a UE or relay operates as the transmitting device 10 on UL and as the receiving device 20 on DL. In the exemplary embodiments of the present invention, a BS operates as the receiving device 20 on UL and as the transmitting device 10 on DL.

The above-described detailed configuration of the UE or BS functioning as the receiving device and the transmitting device may be implemented such that description contents in the various embodiments of the present invention are independently applied or two or more embodiments are simultaneously applied.

According to an embodiment of the present invention, reception rate of control signals (or channels) of a UE can be improved.

In addition, according to an embodiment of the present invention, throughput of UL transmission and DL transmission in a wireless communication system can be improved.

The exemplary embodiments of the present invention may be used for a BS, a UE, or other equipment in a wireless communication system.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for measuring a downlink signal from a serving evolved Node B (eNB) having multi-layered antennas at a User Equipment (UE) in a wireless communication system, the method comprising:
    receiving information about a Beam Direction Pattern (BDP) to be used to transmit the downlink signal in each of a plurality of subframes from the serving eNB,
    wherein the BDP is one of multiple BDPs and each of the multiple BDPs is associated with a respective one of the multi-layered antennas;
    receiving and measuring the downlink signal for each of the plurality of subframes based on the received information about the BDP;
    reporting BDP information related to downlink signal reception quality based on a result of measuring the downlink signal to the serving eNB,
    wherein the BDP information related to downlink signal reception quality includes information about a BDP causing best downlink signal reception quality and information about a BDP causing worst downlink signal reception quality, and the BDP information related to downlink signal reception quality is used for estimating a geographical position of the UE; and
    transitioning to an idle state in a subframe except for a subframe transmitted using the BDP causing best downlink signal reception quality,
    wherein when the downlink signal includes scheduling information indicating a plurality of subframes, the BDP is used to transmit the downlink signal in a control region of each of the plurality of subframes, and all of the multiple BDPs are used to transmit the downlink signal in a data region of each of the plurality of subframes.

2. The method according to claim 1, wherein the received information about the BDP includes a BDP to be used to transmit the downlink signal in a subframe set.

3. The method according to claim 2, further comprising receiving downlink control information in one subframe set indicated by the received information about the BDP.

4. The method according to claim 3, wherein the downlink control information indicates scheduling of downlink data information in a subframe set other than a subframe set in which the downlink control information is received.

5. A method for transmitting a downlink signal at an evolved Node B (eNB) having multi-layered antennas in a wireless communication system, the method comprising:
    transmitting information about a Beam Direction Pattern (BDP) to be used to transmit the downlink signal in each of a plurality of subframes, to a User Equipment (UE), wherein the BDP is one of multiple BDPs and each of the multiple BDPs is associated with a respective one of the multi-layered antennas;

transmitting the downlink signal for each of the plurality of subframes based on the transmitted information about the BDP; and, receiving, from the UE, BDP information related to downlink signal reception quality based on a downlink signal measured result performed by the UE, wherein the BDP information related to downlink signal reception quality includes information about a BDP causing best downlink signal reception quality and information about a BDP causing worst downlink signal reception quality, and the BDP information related to downlink signal reception quality is used for estimating a geographical position of the UE, wherein the UE transitions to an idle state in a subframe except for a subframe transmitted using the BDP causing best downlink signal reception quality, and wherein when the downlink signal includes scheduling information indicating a plurality of subframes, the BDP is used to transmit the downlink signal in a control region of each of the plurality of subframes, and all of the multiple BDPs are used to transmit the downlink signal in a data region of each of the plurality of subframes.

6. The method according to claim 5, wherein the transmitted information about the BDP includes a BDP to be used to transmit the downlink signal in each subframe set.

7. The method according to claim 6, further comprising transmitting downlink control information for the UE in one subframe set indicated by the transmitted information about the BDP.

8. The method according to claim 7, wherein the downlink control information indicates scheduling of downlink data information in a subframe set other than a subframe set in which the downlink control information is received.

9. The method according to claim 1, further comprising:
determining a preferred BDP by comparing results of measuring the downlink signal for each of the plurality of subframes.

10. The method according to claim 9, further comprising:
performing a radio resource measurement (RRM) in a subframe in which the preferred BDP is used to transmit the downlink signal.

* * * * *